US012713315B2

(12) United States Patent
Chandrashekar

(10) Patent No.: US 12,713,315 B2
(45) Date of Patent: Aug. 18, 2026

(54) SYSTEM AND METHOD TO ENABLE MULTIPLE BASE REFERENCE CONFIGURATIONS FOR LAYER 1/LAYER2 TRIGGERED MOBILITY IN A TELECOMMUNICATIONS NETWORK

(71) Applicant: Rakuten Symphony, Inc., Tokyo (JP)

(72) Inventor: Subramanya Chandrashekar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 347 days.

(21) Appl. No.: 18/290,049

(22) PCT Filed: Oct. 20, 2023

(86) PCT No.: PCT/US2023/035570

§ 371 (c)(1), (2) Date: Nov. 9, 2023

(87) PCT Pub. No.: WO2024/181996

PCT Pub. Date: Sep. 6, 2024

(65) Prior Publication Data

US 2025/0097795 A1 Mar. 20, 2025

(30) Foreign Application Priority Data

Feb. 27, 2023 (IN) ............................ 202321013153

(51) Int. Cl.
*H04W 36/00* (2009.01)
*H04W 36/04* (2009.01)
(Continued)

(52) U.S. Cl.
CPC ....... *H04W 36/04* (2013.01); *H04W 36/0016* (2013.01); *H04W 36/0058* (2018.08); *H04W 76/20* (2018.02); *H04W 92/24* (2013.01)

(58) Field of Classification Search
None
See application file for complete search history.

(56) References Cited

U.S. PATENT DOCUMENTS

2020/0329365 A1* 10/2020 Luo .................... H04L 41/0803
2025/0358696 A1* 11/2025 Zhang .............. H04W 36/0058

FOREIGN PATENT DOCUMENTS

WO WO2024167452 * 8/2024

OTHER PUBLICATIONS

Ericsson, "Discussion on procedures for LTM", 3GPP TSG-RAN WG2 #121, R2-2301196, Athens, Greece, Feb. 27-Mar. 3, 2023, pp. 1-14 (14 pages total).

(Continued)

*Primary Examiner* — Mohammad S Adhami
(74) *Attorney, Agent, or Firm* — Sughrue Mion, PLLC

(57) ABSTRACT

Systems and methods for implementing multiple base reference configurations for layer1/layer2 triggered mobility in a telecommunications network are provided. The method includes: receiving a first base reference configuration and an indicator indicating an association between a type/characteristics of a first cell and the first base reference configuration from a serving Distributed Unit (gNB-DU), wherein the serving gNB-DU supports the first cell that serves a user equipment (UE); sending, during candidate cell configuration preparation, the first base reference configuration or the indication to provide a new reference configuration to a target Distributed Unit (target gNB-DU), wherein the target gNB-DU supports a second cell to be prepared as a LTM candidate cell for an LTM handover; determining whether the first base reference configuration is usable with a delta configuration to obtain a full second cell configuration for the second cell; sending a second base reference configuration corresponding to the second cell configuration.

20 Claims, 12 Drawing Sheets

(51) Int. Cl.
*H04W 76/20* (2018.01)
*H04W 92/24* (2009.01)

(56) References Cited

OTHER PUBLICATIONS

InterDigital, Inc., “LTM candidate configurations.”, 3GPP TSG RAN WG2 #121, R2-2300577, Athens, Greece, Feb. 27-Mar. 3, 2023 (6 pages total).

* cited by examiner

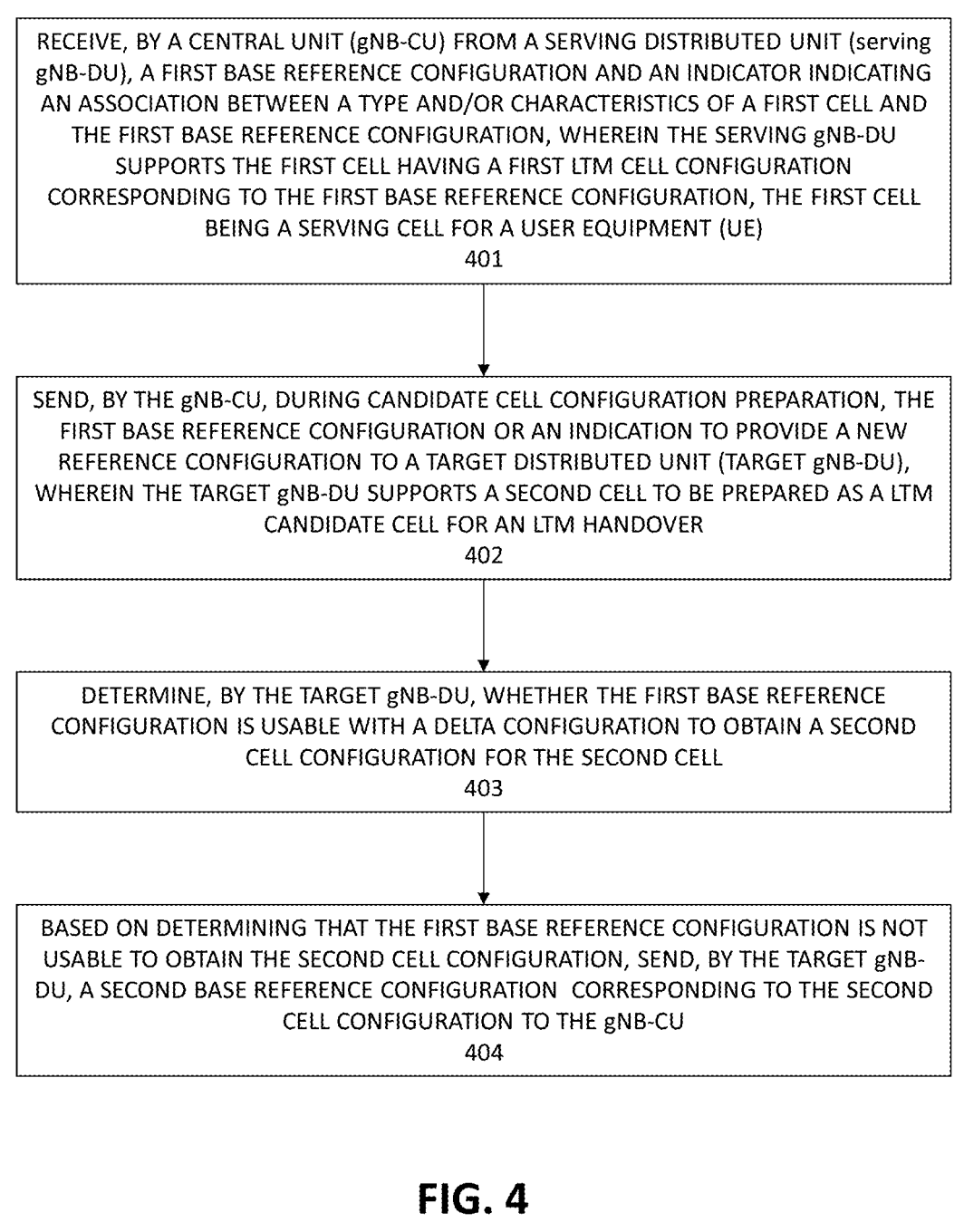

RECEIVE, BY A CENTRAL UNIT (gNB-CU) FROM A SERVING DISTRIBUTED UNIT (serving gNB-DU), A FIRST BASE REFERENCE CONFIGURATION AND AN INDICATOR INDICATING AN ASSOCIATION BETWEEN A TYPE AND/OR CHARACTERISTICS OF A FIRST CELL AND THE FIRST BASE REFERENCE CONFIGURATION, WHEREIN THE SERVING gNB-DU SUPPORTS THE FIRST CELL HAVING A FIRST LTM CELL CONFIGURATION CORRESPONDING TO THE FIRST BASE REFERENCE CONFIGURATION, THE FIRST CELL BEING A SERVING CELL FOR A USER EQUIPMENT (UE)
401

SEND, BY THE gNB-CU, DURING CANDIDATE CELL CONFIGURATION PREPARATION, THE FIRST BASE REFERENCE CONFIGURATION OR AN INDICATION TO PROVIDE A NEW REFERENCE CONFIGURATION TO A TARGET DISTRIBUTED UNIT (TARGET gNB-DU), WHEREIN THE TARGET gNB-DU SUPPORTS A SECOND CELL TO BE PREPARED AS A LTM CANDIDATE CELL FOR AN LTM HANDOVER
402

DETERMINE, BY THE TARGET gNB-DU, WHETHER THE FIRST BASE REFERENCE CONFIGURATION IS USABLE WITH A DELTA CONFIGURATION TO OBTAIN A SECOND CELL CONFIGURATION FOR THE SECOND CELL
403

BASED ON DETERMINING THAT THE FIRST BASE REFERENCE CONFIGURATION IS NOT USABLE TO OBTAIN THE SECOND CELL CONFIGURATION, SEND, BY THE TARGET gNB-DU, A SECOND BASE REFERENCE CONFIGURATION CORRESPONDING TO THE SECOND CELL CONFIGURATION TO THE gNB-CU
404

FIG. 4

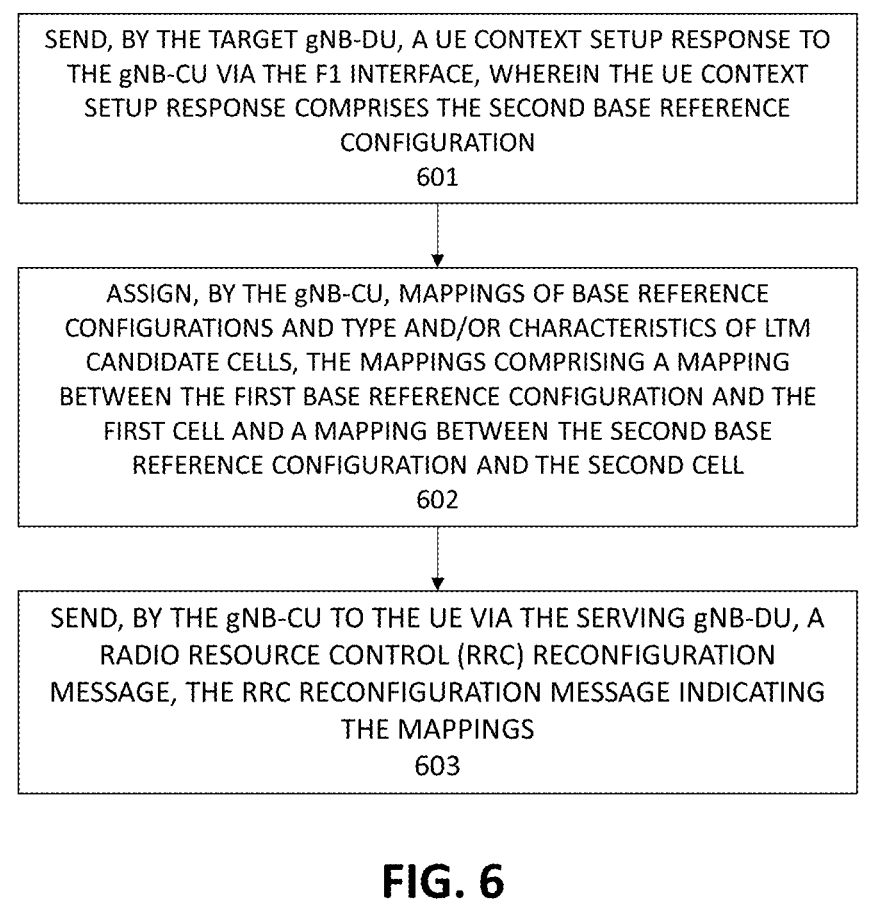

SEND, BY THE TARGET gNB-DU, A UE CONTEXT SETUP RESPONSE TO THE gNB-CU VIA THE F1 INTERFACE, WHEREIN THE UE CONTEXT SETUP RESPONSE COMPRISES THE SECOND BASE REFERENCE CONFIGURATION
601

ASSIGN, BY THE gNB-CU, MAPPINGS OF BASE REFERENCE CONFIGURATIONS AND TYPE AND/OR CHARACTERISTICS OF LTM CANDIDATE CELLS, THE MAPPINGS COMPRISING A MAPPING BETWEEN THE FIRST BASE REFERENCE CONFIGURATION AND THE FIRST CELL AND A MAPPING BETWEEN THE SECOND BASE REFERENCE CONFIGURATION AND THE SECOND CELL
602

SEND, BY THE gNB-CU TO THE UE VIA THE SERVING gNB-DU, A RADIO RESOURCE CONTROL (RRC) RECONFIGURATION MESSAGE, THE RRC RECONFIGURATION MESSAGE INDICATING THE MAPPINGS
603

FIG. 6

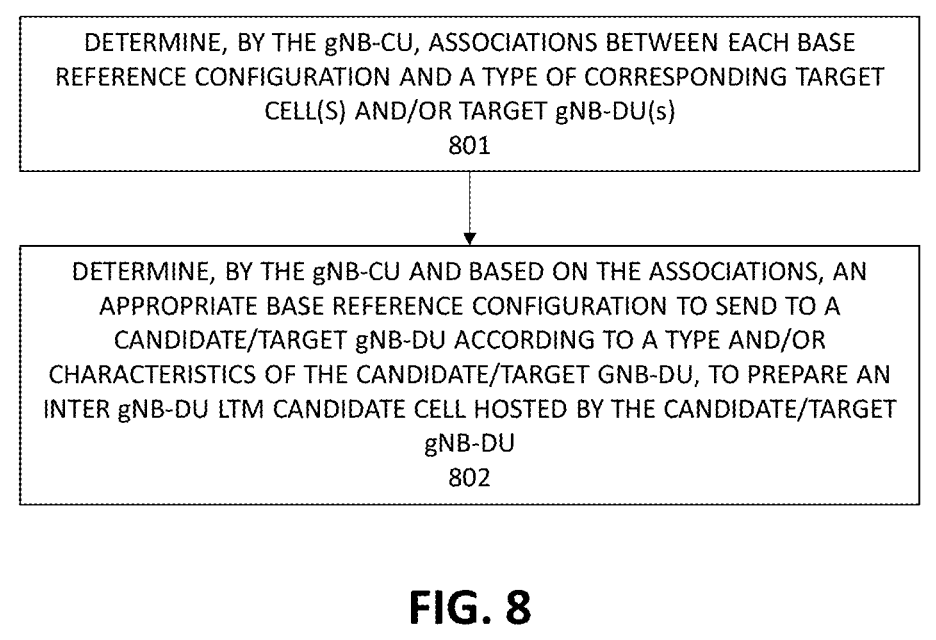

DETERMINE, BY THE gNB-CU, ASSOCIATIONS BETWEEN EACH BASE REFERENCE CONFIGURATION AND A TYPE OF CORRESPONDING TARGET CELL(S) AND/OR TARGET gNB-DU(s)
801

DETERMINE, BY THE gNB-CU AND BASED ON THE ASSOCIATIONS, AN APPROPRIATE BASE REFERENCE CONFIGURATION TO SEND TO A CANDIDATE/TARGET gNB-DU ACCORDING TO A TYPE AND/OR CHARACTERISTICS OF THE CANDIDATE/TARGET GNB-DU, TO PREPARE AN INTER gNB-DU LTM CANDIDATE CELL HOSTED BY THE CANDIDATE/TARGET gNB-DU
802

FIG. 8

SYSTEM AND METHOD TO ENABLE MULTIPLE BASE REFERENCE CONFIGURATIONS FOR LAYER 1/LAYER2 TRIGGERED MOBILITY IN A TELECOMMUNICATIONS NETWORK

CROSS-REFERENCE TO RELATED APPLICATION(S)

This application is a National Stage of International Application No. PCT/US2023/035570 filed Oct. 20, 2023, which is based on and claims priority from Indian Provisional Patent Application No. 20/232,1013153, filed at the Indian Patent Office on Feb. 27, 2023, the disclosure of which is incorporated by reference herein in its entirety.

TECHNICAL FIELD

Systems and methods consistent with example embodiments of the present disclosure relate to the implementation of multiple base reference configurations for layer 1/layer2 triggered mobility in a telecommunications network.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU).

The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to the DU. As these entities have open protocols and interfaces between them, they can be developed by different vendors.

FIG. 1A illustrates a related art O-RAN architecture. Referring to FIG. 1A, RAN functions in the O-RAN architecture are controlled and optimized by a RAN Intelligent Controller (RIC) The RIC is a software-defined component that implements modular applications to facilitate the multivendor operability required in the O-RAN system, as well as to automate and optimize RAN operations. The RIC is divided into two types: a non-real-time RIC (NRT RIC) and a near-real-time RIC (nRT RIC).

The NRT RIC is the control point of a non-real-time control loop and operates on a timescale greater than 1 second within the Service Management and Orchestration (SMO) framework. Its functionalities are implemented through modular applications called rApps (rApp 1, . . . , rApp N in FIG. 1A), and include: providing policy based guidance and enrichment across the AI interface, which is the interface that enables communication between the NRT RIC and the nRT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT RIC, O-RA centralized Unit (O-CU), O-RAN Distributed Unit (O-DU), etc.).

The nRT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The O-CU communicates with the O-DU via an F1 interface, (e.g., the O-CU-CP may communicate with the O-DU via an F1-C interface and the O-CU-UP may communicate with the O-DU via an F1-U interface).

The nRT RIC uses the E2 interface to control the underlying RAN elements (E2 nodes/network functions (NFs)) over a near-real-time control loop. The nRT RIC monitors, suspends/stops, overrides, and controls the E2 nodes (O-CU, O-DU, and O-eNB) via policies. For example, the nRT sets policy parameters on activated functions of the E2 nodes. Further, the nRT RIC hosts xApps to implement functions such as quality of service (QOS) optimization, mobility optimization, slicing optimization, interference mitigation, load balancing, security, etc. The two types of RICs work together to optimize the O-RAN. For example, the NRT RIC provides, over the AI interface, the policies, data, and AI/ML models enforced and used by the nRT RIC for RAN optimization, and the nRT returns policy feedback (i.e., how the policy set by the NRT RIC works).

The SMO framework, within which the NRT RIC is located, manages and orchestrates RAN elements. Specifically, the SMO manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

According to related art O-RAN architecture, FIG. 1B illustrates the disaggregated architecture for separation of gNB-CU-CP, gNB-CU-UP and gNB-DUs as defined in Third Generation Partnership Project (3GPP) (i.e., 3GPP TS 38.401 version 16.3.0 Release 16), where a Next Generation Node B (gNB) is decomposed into multiple logical entities.

Referring to FIG. 1B, the gNB may include a gNB-CU-CP, multiple gNB-CU-UPs and multiple gNB-DUs.

Regarding the communication within the disaggregated architecture, the gNB-CU-CP is connected to the gNB-DU through the F1-C interface, the gNB-CU-UP is connected to the gNB-DU through the F1-U interface, the gNB-CU-UP is connected to the gNB-CU-CP through the E1 interface, wherein one gNB-DU is connected to only one gNB-CU-CP and one gNB-CU-UP is connected to only one gNB-CU-CP. Moreover, a single gNB-DU may host multiple cells (e.g., a maximum of 512 cells as defined in the 3GPP specifications).

The gNB-DU hosts Radio Link Control (RLC), Medium Access Control (MAC) and Physical (PHY) layers, wherein scheduling operations of information takes place at the gNB-DU. The gNB-DU terminates the F1 interface connected with the gNB-CU. Thus, the gNB-DU is a logical node whose operations are partly controlled by gNB-CU (i.e., 3GPP TS 38.401 version 16.3.0 Release 16).

The gNB-CU-CP hosts a Packet Data Convergence Protocol (PDCP) layer and a Radio Resource Control (RRC) layer.

In particular, the gNB-CU-CP refers to a logical node hosting the Radio Resource Control (RRC) and the control plane part of the PDCP protocol of the gNB-CU for an en-gNB or a gNB. The gNB-CU-CP terminates the E1 interface connected with the gNB-CU-UP and the F1-C interface connected with the gNB-DU (i.e., 3GPP TS 38.401 version 16.3.0 Release 16).

In the related art, the scheduling operations do not support L1/L2 centric inter-cell change (i.e., a change of serving cell). To this end, in the related art, both configuration preparation and handover execution are performed via RRC by gNB-CU-CP.

As a result, the scheduling operations for both the configuration preparation and the handover execution according to the related art involves an exchange of extensive configuration data between the network entities of the RAN (i.e., the UEs, O-RU, O-DU, and O-CU), which is time-consuming and requires high latency.

SUMMARY

According to embodiments, systems and methods provided relate to the implementation of multiple base reference configurations for layer 1/layer2 triggered mobility (LTM) in a telecommunications network, wherein the scheduling operation optimizes a sequential L1/L2 cell change between a source cell and candidate cells without additional RRC reconfiguration by implementing multiple base reference configurations to optimize the inter-cell mobility to allow new radio (NR) mobility enhancements that optimizes the LTM cell switching.

To this end, systems and methods optimize the exchange of base reference configurations between logical nodes (i.e., gNB-CU, serving gNB-DU, candidate gNB-DU) and a user entity (UE). In particular, systems and methods allow a gNB-CU to receive base reference configuration of a source cell (i.e., a service cell) from a serving gNB-DU and the base reference configurations of at least one candidate cell from a candidate gNB-DU.

In case the configuration of a candidate cell (i.e., target cell) is substantially different from the configuration of a source cell (i.e., determining the candidate cell configuration using the base reference configuration of the serving cell is not simple, but complex and expensive), the gNB-CU maintains multiple base reference configurations depending on the type and characteristics of the candidate cell (i.e., the base reference configurations of the serving cell from the serving gNB-DU and the base reference configuration from the at least one candidate cell (i.e., target cell) from the candidate gNB-DU).

Based on the information exchanged during the setup of a gNB-DU, i.e., F1 interface setup, the gNB-CU is aware of the kind of cells (i.e., type and/or characteristics of LTM candidate cells) served by one or more gNB-DUs. Thus, the gNB-CU may easily determine which base reference configuration needs to be used when sending an LTM handover preparation request to a target gNB-DU (i.e., a target gNB-DU), thereby effectively avoiding subsequent Long-Term Serving Cell Changes (LTM SCC) with additional RRC reconfigurations due to the UE's inability to prepare a full cell configuration of the candidate cell.

Thus, systems and methods according to example embodiments have the advantage to resolve shortcomings of using the delta configurations on top of a reference configuration in LTM cell switching according to the related art which enhances new radio (NR) inter-cell mobility significantly.

According to an embodiment, a system for implementing multiple base reference configurations for layer1/layer2 triggered mobility (LTM) in a telecommunications network, includes: at least one memory storing instructions; and at least one processor configured to execute the instructions to receive, by a Central Unit (gNB-CU) from a serving Distributed Unit (serving gNB-DU), a first base reference configuration and an indicator indicating an association between a type and/or characteristics of a first cell and the first base reference configuration from a serving Distributed Unit (serving gNB-DU), wherein the serving gNB-DU supports the first cell having a first LTM cell configuration corresponding to the first base reference configuration, the first cell being a serving cell for a user equipment (UE); send, by the gNB-CU during candidate cell configuration preparation, the first base reference configuration or an indication to provide a new reference configuration to a target Distributed Unit (target gNB-DU), wherein the target gNB-DU supports a second cell to be prepared as a LTM candidate cell for an LTM handover; determine, by the target gNB-DU, whether the first base reference configuration is usable with a delta configuration to obtain a full second cell configuration for the second cell; and based on determining that the first base reference configuration is not usable to obtain the second cell configuration, send, by the target gNB-DU to the gNB-CU, a second base reference configuration corresponding to the second cell configuration.

According to an embodiment, a method for implementing multiple base reference configurations for layer1/layer2 triggered mobility (LTM) in a telecommunications network, includes: receiving, by a Central Unit (gNB-CU) from a serving Distributed Unit (serving gNB-DU), a first base reference configuration and an indicator indicating an association between a type and/or characteristics of a first cell and the first base reference configuration, wherein the serving gNB-DU supports the first cell having a first LTM cell configuration corresponding to the first base reference configuration, the first cell being a serving cell for a user equipment (UE); sending, by the gNB-CU during candidate cell configuration preparation, the first base reference configuration or an indication to provide a new reference configuration to a target Distributed Unit (target gNB-DU), wherein the target gNB-DU supports a second cell to be prepared as a LTM candidate cell for an LTM handover; determining, by the target gNB-DU, whether the first base reference configuration is usable with a delta configuration to obtain a full second cell configuration for the second cell; and based on determining that the first base reference configuration is not usable to obtain the second cell configuration, sending, by the target gNB-DU to the gNB-CU, a second base reference configuration corresponding to the second cell configuration.

According to an embodiment, a non-transitory computer-readable recording medium having recorded thereon instructions executable by at least one processor to cause the at least one processor to perform a method for implementing multiple base reference configurations for layer1/layer2 triggered mobility (LTM) in a telecommunications network is provided. The method includes: receiving, by a Central Unit (gNB-CU) from a serving Distributed Unit (serving gNB-DU), a first base reference configuration and an indicator indicating an association between a type and/or characteristics of a first cell and the first base reference, wherein the serving gNB-DU supports the first cell having a first LTM cell configuration corresponding to the first base reference configuration, the first cell being a serving cell for a user equipment (UE); sending, by the gNB-CU during candidate cell configuration preparation, the first base reference configuration or an indication to provide a new reference configuration to a target Distributed Unit (target gNB-DU), wherein the target gNB-DU supports a second cell to be prepared as a LTM candidate cell for an LTM handover; determining, by the target gNB-DU, whether the first base reference configuration is usable with a delta configuration to obtain a full second cell configuration for the second cell; and based on determining that the first base reference configuration is not usable to obtain the second cell configuration, sending, by the target gNB-DU to the gNB-CU, a second base reference configuration corresponding to the second cell configuration.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 1B illustrates the disaggregated architecture for separation of gNB-CU-CP, gNB-CU-UP and gNB-DUs according to the related art;

FIG. 4 illustrates a flowchart of a method for implementing multiple base reference configurations for layer 1/layer2 triggered mobility (LTM) according to an embodiment;

FIG. 6 illustrates a flowchart of a method for signaling a second base reference configuration between a candidate gNB-DU, a gNB-CU, a serving gNB-DU and a UE according to an embodiment;

FIG. 8 illustrates a flowchart of a method storing base reference configuration as a base reference configuration type to the plurality of base reference configuration types according to another embodiment;

DETAILED DESCRIPTION

The following detailed description of exemplary embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1A:
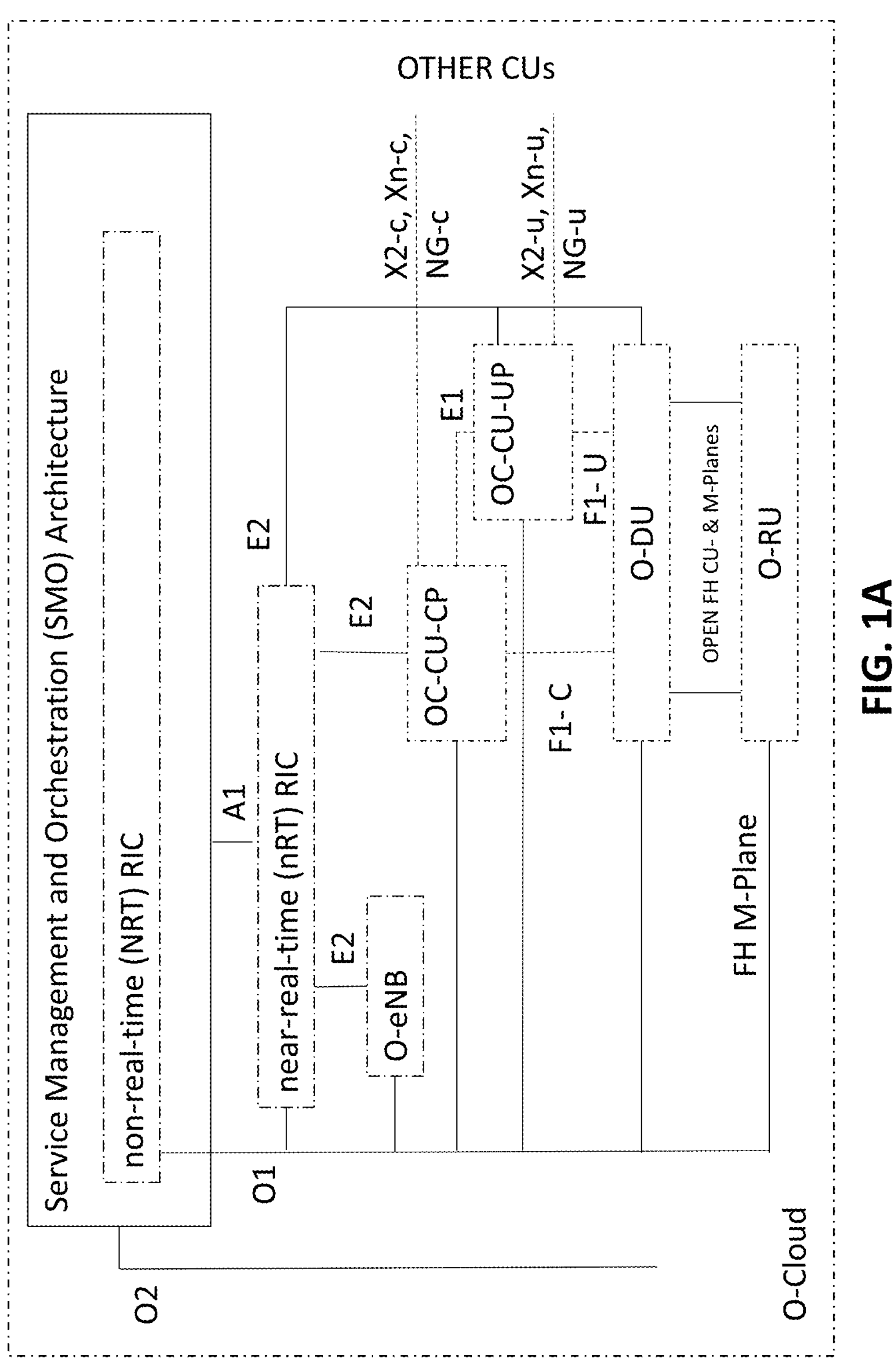
FIG. 1A illustrates an O-RAN architecture according to the related art.
Figure 1B:
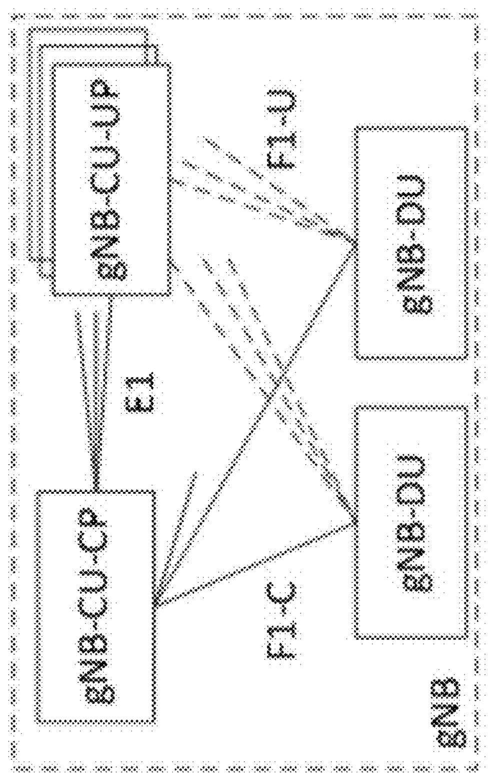
FIG. 1B illustrates
Figure 2:
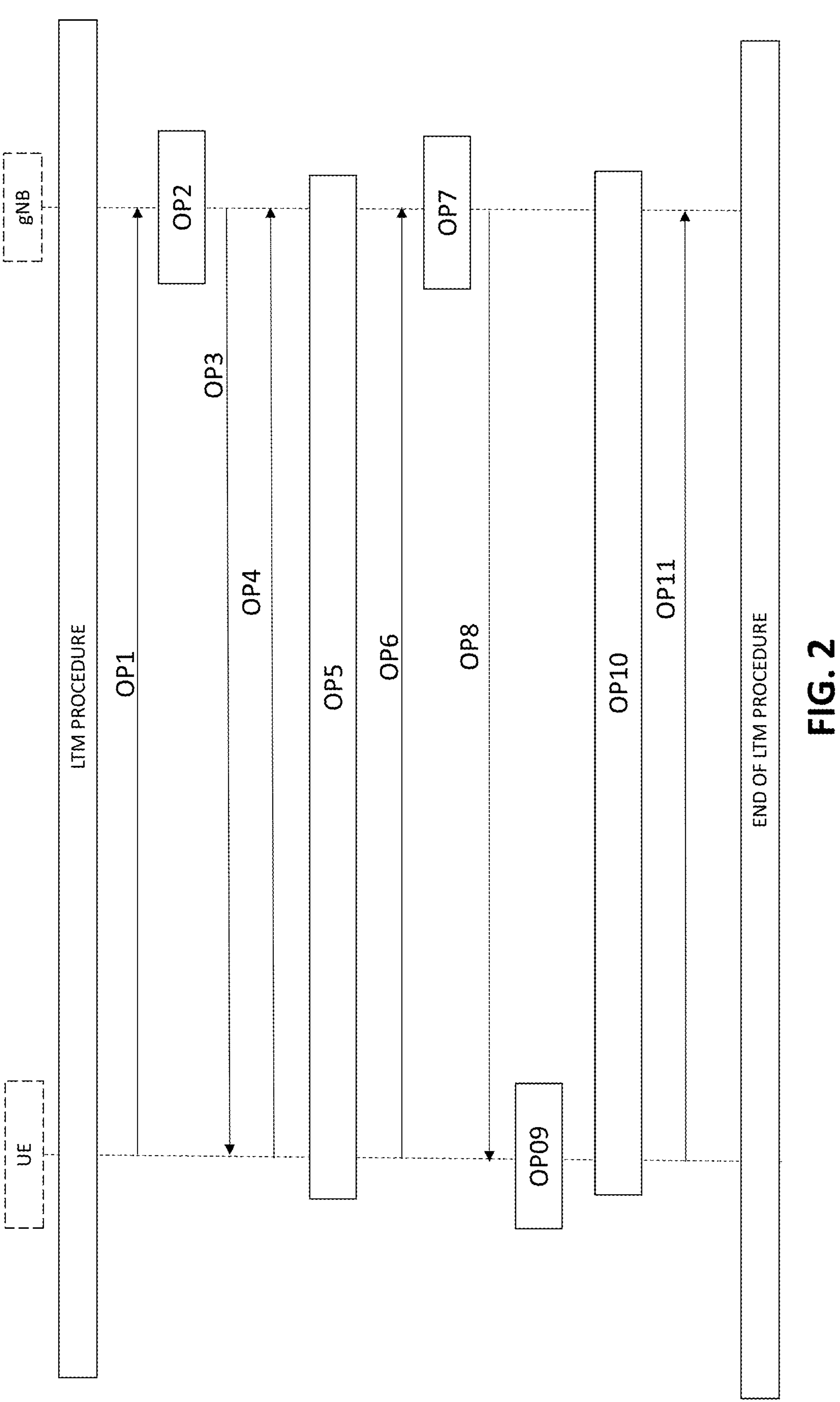
FIG. 2 illustrates an operation flowchart of a method for layer 1/layer2 triggered mobility (LTM) according to the related art.

FIG. 2 illustrates an operation flowchart of a method for layer 1/layer2 triggered mobility (LTM) according to the related art. Referring to FIG. 2, a serving cell change is triggered by layer 3 (L3) measurements and is done by RRC signaling (i.e., Reconfiguration with Synchronization information element) for serving cell change by a candidate cell (i.e., target cell).

Herein forth, target cell and candidate cell may be used interchangeably wherein the target cell or selected candidate cell is a candidate cell that has been selected for LTM handover (i.e., LTM cell switching).

In operation 1, the UE sends a Measurement Report message to a gNodeB (gNB). In operation 2, based on the Measurement Report message, the gNB may determine to use LTM and initiates LTM candidate preparation (i.e., a candidate cell preparation).

In operation 3, the gNB sends an RRC Reconfiguration message to the UE including the configuration of at least one LTM candidate cell (i.e., target cell).

In operation 4, the UE stores the configuration of the at least one LTM candidate cell (i.e., a target cell) and sends a RRC Reconfiguration Complete message to the gNB.

In operation 5, the UE may perform downlink (DL) synchronization and timing advance (TA) acquisition with the at least one LTM candidate cell (i.e., target cell) before receiving the LTM cell switch command.

In operation 6, the UE performs Layer 1 (L1) measurements on the at least one configured (i.e. selected) LTM candidate cell (i.e., target cell) from the one or more LTM candidate target cell(s), and transmits lower-layer measurement reports to the gNB.

In operation 7, the gNB decides to execute the LTM cell switch to a target cell, based on predefined internal Radio Resource Management (RRM) criteria.

In operation 8, the gNB sends a Medium Access Control (MAC) control element (MAC-CE) triggering the LTM cell switch to the UE.

In operation 9, upon UE receiving the Medium Access Control (MAC) control element comprising the LTM cell switching command, the UE switches to the configuration of the candidate cell (i.e., target cell).

In operation 10, after switching to the configuration of the candidate cell (i.e., target cell), the UE may perform a random access procedure toward the target cell.

In operation 11, the UE indicates successful completion of the LTM cell switch towards the target cell, for example, by sending an RRC Reconfiguration Acknowledgement message to the gNB.

Figures 3A, 3B:
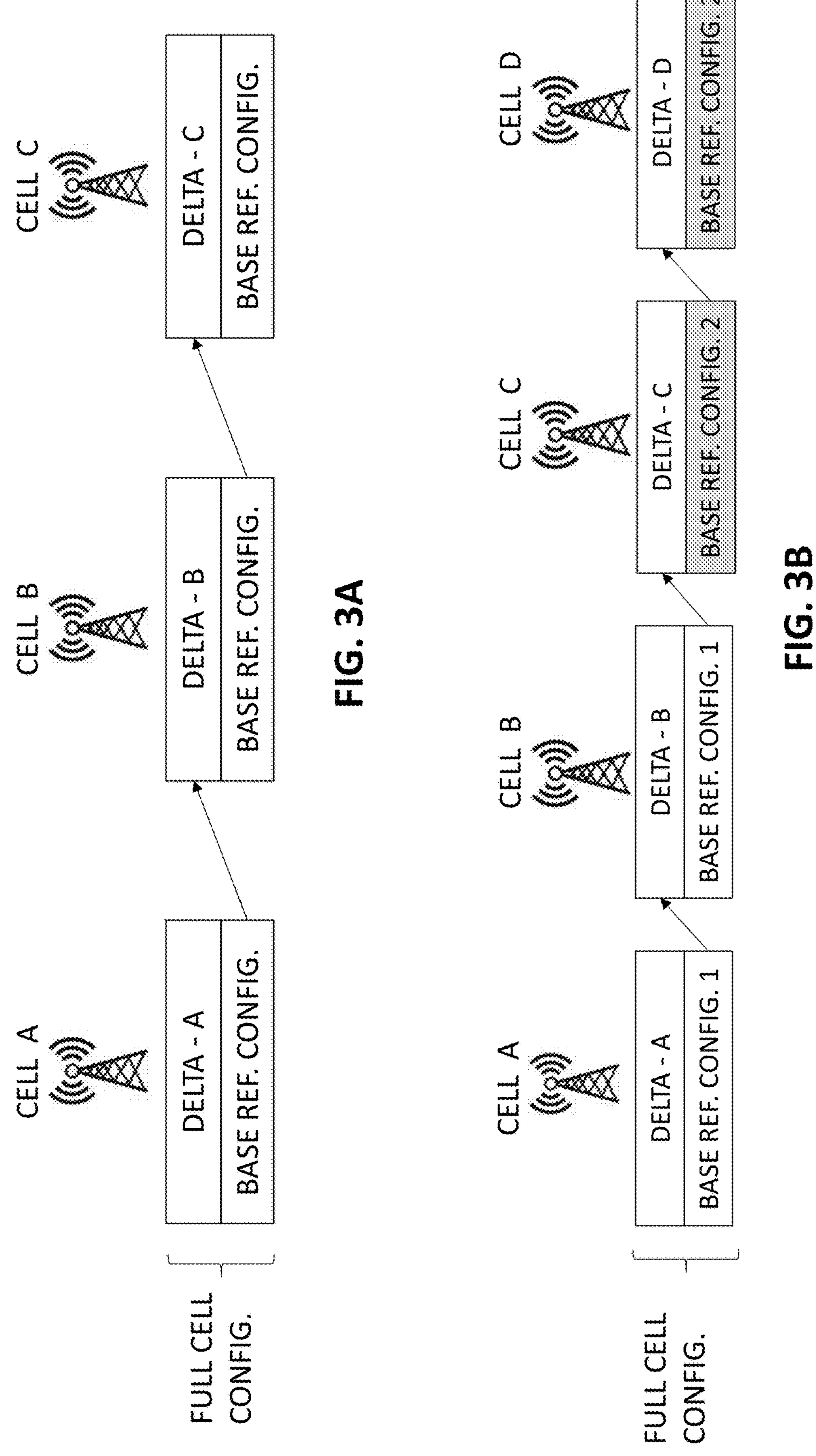
FIG. 3A illustrates delta configuration on top of a base reference configuration according to an embodiment.
FIG. 3B illustrates delta configuration on top of a base reference configuration according to another embodiment.

FIG. 3A illustrates delta configuration on top of a base reference configuration according to an embodiment. Referring to FIG. 3A, UE starts from cell A, and is configured with LTM candidates B and C, wherein cell A, B and C share the same base reference configuration.

A base reference configuration, for example, may refer to a configuration of a radio cell, i.e., the basic configuration of a radio cell type in a RAN. A cell configuration could be segregated into common aspects (i.e., common information for all cells of the same gNB-DU or cells of a neighboring gNB-DU with similar characteristics and cell specific aspects, such as, for example, information unique to a given cell). The common aspects could be grouped together to form a reference configuration, which can be used by all applicable cells.

To this end, for example, a base reference configuration may refer to the basic configuration of one of the main types of radio cells such as macrocells, microcells, picocells, femtocells, etc.

For example, the base reference configuration of macrocell provides wide-area coverage, typically spanning several kilometers to cover outdoor areas, such as cities, suburbs, and rural regions, where many users can be accommodated. The base reference configuration of a macrocell may substantiate different from that of microcells that offer coverage over smaller areas, usually a few hundred meters to a kilometer. Accordingly, a microcell base reference configuration differs from that of a picocell ranging from tens to a few hundred meters, a picocell base reference configuration differs from that of a femtocell that is designed to cover small indoor spaces like homes and offices, etc.

Moreover, delta configurations, such as Delta-A, Delta-B and Delta-C refer to an individual configuration of the radio cells A, B and C, respectively. The delta configurations extend beyond the base reference configuration to individualize the cell configuration based on strategic topological placement to optimize the user experience across different coverage areas and improve overall network performance.

In the LTM cell switch according to the related art, the candidate cell configuration in LTM cell switch is provided in the form of a delta configuration (e.g., Delta-A, Delta-B and Delta-C) on top of the base reference configuration (e.g., that of cells A, B and C).

Moreover, in the LTM cell switch according to one of the aspects, in addition to the base reference configuration (e.g., the current RRC configuration of cells A, B, or C), the UE maintains a separate reference configuration index (R) (i.e., a base reference configuration index comprising a plurality of base reference configuration types), as indicated by the network. This index can be later used by both UE and network to indicate which reference configuration is being referred to.

Upon LTM cell switch (i.e., a cell switch command from the gNB), the target configuration (i.e., candidate cell configuration) based on base separate reference configuration (R) and the delta configuration is applied, and this allows the UE to prepare a full configuration of the desired (selected) target cell (i.e., candidate cell) and the subsequent LTM change-over, respectively.

As a result, the full configuration for a candidate cell can be prepared by applying the delta configuration of that cell on top of the base configuration.

FIG. 3B illustrates delta configuration on top of a base reference configuration according to another embodiment. Referring to FIG. 3B, LTM target cells (i.e., candidate cells for LTM cell switching) A and B have first base reference configuration (e.g., Base Ref Conf1).

For example, the first base reference configuration may be a base reference configuration of a macro cell in the sub 6 GHz spectrum.

Meanwhile, LTM target cells (i.e., candidate cells for LTM cell switching) C and D have second base reference configuration. For example, the first base reference configuration may be a base reference configuration of a femtocell in the millimeter wave band. On top of the different first and second base reference configurations, cells A, B, C and D have individual delta configurations Delta-A, Delta-B, Delta-C and Delta-D, respectively.

In the above scenario, or in general, if the candidate cell configuration is substantially different from the source cell configuration, it may not be useful to provide an LTM candidate cell configuration as a delta configuration on top of the base reference configuration provided by the serving gNB-DU, as the likelihood of delta being huge is very strong. In such cases, the candidate cell configuration may need to be provided as a full configuration.

With respect to the operations in FIG. 2 and the delta configuration on top of a base reference configuration according to FIG. 3A and FIG. 3B, it may become impossible for the UE to determine which base reference configuration to use when determining the full configuration of a target cell. For example, if LTM target cells A and B are prepared using Base Ref Conf1 and LTM target cells C and D are prepared using Base Ref Conf2, the UE cannot determine which base reference configuration to use to prepare the target cell configuration.

FIG. 4 illustrates a flowchart of a method for implementing multiple base reference configurations for layer 1/layer2 triggered mobility (LTM) according to an embodiment.

Referring to FIG. 4, in step 401, a Central Unit (gNB-CU) receives a first base reference configuration and an indicator indicating an association between a type and/or characteristics of a first cell and the first base reference configuration from a serving Distributed Unit (i.e., a serving gNB-DU), wherein the serving gNB-DU supports the first LTM cell having a first cell configuration corresponding to the first base reference configuration, the first cell being a serving cell for a user equipment (UE).

In step 402, the gNB-CU sends, during candidate cell configuration preparation, the first base reference configuration or an indication to provide a new reference configuration to a target Distributed Unit (i.e., a target gNB-DU), wherein the target gNB-DU supports a second cell to be prepared as a LTM candidate cell for an LTM handover.

In step 403, the target gNB-DU determines whether the first base reference configuration is usable with a delta configuration to obtain a full second cell configuration for the second cell.

In step 404, based on determining that the first base reference configuration is not usable to obtain the second cell configuration, the target gNB-DU sends a second base reference configuration corresponding to the second cell configuration to the gNB-CU.

In another embodiment, in step 404, based on determining that the first base reference configuration is not usable to obtain the second cell configuration, the target gNB-DU sends an indicator indicating an association between a type and/or characteristics of LTM candidate cells of the target gNB-DU and the second base reference configuration to the gNB-CU.

Moreover, cells A and B as well as cells C and D may be hosted in different types of gNB-DUs, wherein cells A and B are hosted in a gNB-DU FR1 and cells C and D gNB-DU FR2. In this case, multiple base reference configurations may also be used for LTM candidate cell preparation.

Based on the method illustrated in FIG. 4, the gNB-CU maintains multiple base reference configurations depending on the type and characteristics of the candidate cell (i.e., target cell) and/or the gNB-DU hosting it (i.e., an indexed plurality of base reference configuration types) from which the candidate cell (i.e., target cell).

As a result, based on the base multiple base reference configurations, the gNB-CU is aware of the kind of cells (i.e., type and/or characteristics of LTM candidate cells) served by a gNB-DU and the gNB-CU may easily determine which base reference configuration needs to be used when sending an LTM handover preparation request to a target gNB-DU (i.e., a target gNB-DU), thereby effectively avoiding subsequent Long-Term Serving Cell Changes (LTM SCC) with additional RRC reconfigurations due to the UE's inability to prepare a full confirmation of the candidate cell.

Thus, unlike the related art, the method in FIG. 4 enables the use of multiple base reference configurations for different LTM candidate cells that allows to resolve the dilemma as set forth above and enhance new radio (NR) mobility by optimizing the LTM cell switching according to the state of the art illustrated in FIG. 2, FIG. 3A and FIG. 3B.

Thus, the embodiments in FIG. 4 have the advantage to resolve shortcomings of the delta configurations in LTM cell switching according to the related art which enhances new radio (NR) inter-cell mobility significantly.

Figure 5:
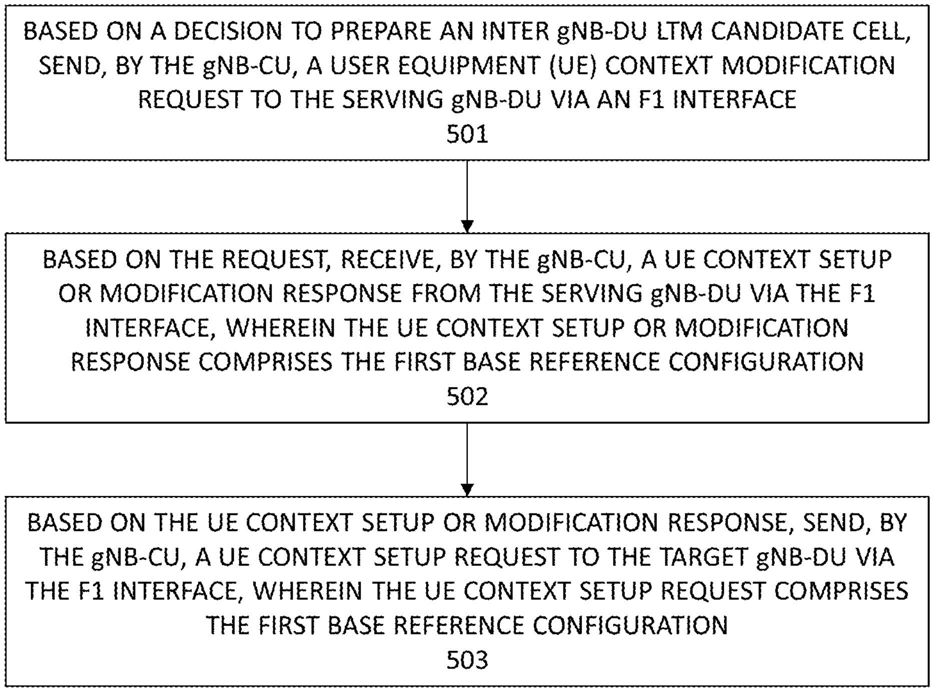
FIG. 5 illustrates a flowchart of a method signaling a first base reference configuration between a serving gNB-DU, a gNB-CU and a candidate gNB-DU via the F1 interface according to an embodiment.

FIG. 5 illustrates a flowchart of a method signaling a first base reference configuration between a serving gNB-DU, a gNB-CU and a candidate gNB-DU via the F1 interface according to an embodiment.

Referring to FIG. 5, in step 501, based on a decision to prepare an inter gNB-DU LTM candidate cell, the gNB-CU sends a user equipment (UE) context setup or modification request to the serving gNB-DU via an F1 interface.

In step 502, based on the request the gNB-CU receives a UE context modification response from the serving gNB-DU via the F1 interface, wherein the UE context modification response comprises the first base reference configuration.

In step 503, based on the UE context setup or modification response the gNB-CU sends a UE context setup request to the target gNB-DU via the F1 interface, wherein the UE context setup request comprises the first base reference configuration.

According to FIG. 5, step 501 to step 503 are mandatory part of initial sequence that are sent in any case upon setup of a serving gNB-DU or in case the UE's serving gNB-DU has changed. However, in case of subsequent candidate cell preparations of a serving gNB-DU steps 501 to 503 may not be performed, for example, where the UE's serving DU has not changed. As a result, the gNB-CU is always aware of the base reference configuration of a serving cell for UE in the serving gNB-DU.

The method according to FIG. 5 has the advantage that the gNB-CU will be aware of the kind of cells (i.e., type and/or characteristics of LTM candidate cells) served by a gNB-DU at the time of initialization or in case in case a UE's serving DU changes. Thus, the gNB-CU at any time may easily determine which base reference configuration needs to be used when sending an LTM handover preparation request to a target gNB-DU (i.e., a target gNB-DU), thereby effectively avoiding subsequent Long-Term Serving Cell Changes (LTM SCC) with additional RRC reconfigurations due to the UE's inability to prepare a full confirmation of the candidate cell.

FIG. 6 illustrates a flowchart of a method for signaling a second base reference configuration between a candidate gNB-DU, a gNB-CU, a serving gNB-DU and a UE according to an embodiment.

Referring to FIG. 6, in step 601 the target gNB-DU, a UE sends a context setup response to the gNB-CU via the F1 interface, wherein the UE context setup response comprises the second base reference configuration.

In step 602, the gNB-CU assigns mappings of base reference configurations and type and/or characteristics of LTM candidate cells, the mappings comprising a mapping between the first base reference configuration and the first cell and a mapping between the second base reference configuration and the second cell.

In step 603, the gNB-CU sends a radio resource control (RRC) reconfiguration message, the RRC reconfiguration message indicating the mappings to the UE via the serving gNB-DU.

According to FIG. 6, on the base of the mappings of base reference configurations and type and/or characteristics of LTM candidate cells, the method has the advantage that the gNB-CU can easily determine which base reference configuration needs to be used when sending an LTM handover preparation request to a target gNB-DU (i.e., a target gNB-DU), thereby effectively avoiding subsequent Long-Term Serving Cell Changes (LTM SCC) with additional RRC reconfigurations due to the UE's inability to prepare a full confirmation of the candidate cell.

Figure 7:
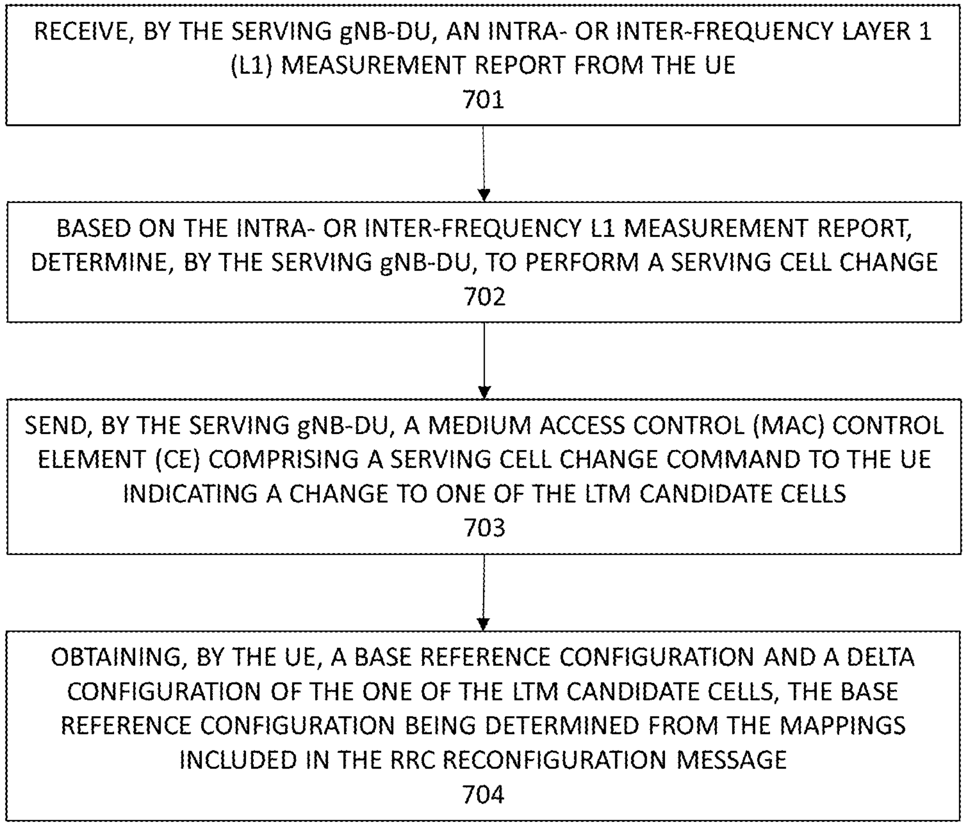
FIG. 7 illustrates a flowchart of a method for preparing a candidate cell configuration based on the base reference configuration index and the delta configuration data of the selected candidate cell to an embodiment.

FIG. 7 illustrates a flowchart of a method for preparing a candidate cell configuration based on the base reference configuration index and the delta configuration data of the selected candidate cell to an embodiment.

Referring to FIG. 7, in step 701, the serving gNB-DU receives an Intra- or Inter-Frequency Layer 1 (L1) measurement report from the UE.

In step 702, based on the Intra- or Inter-Frequency L1 measurement report, the serving gNB-DU determine to perform a serving cell change.

In step 703, the serving gNB-DU sends a Medium Access Control (MAC) Control Element (CE) comprising a serving cell change command to the UE indicating a change to one of the LTM candidate cells (i.e., one o TM candidate cell among a plurality of LTM candidate cells).

In step 704, the UE obtains a full LTM candidate cell configuration based on a base reference configuration and a delta configuration of the one of the LTM candidate cells, the base reference configuration being determined from the mappings included in the RRC Reconfiguration message.

The method of FIG. 7 has the advantage that the UE obtains a full LTM candidate cell configuration based on a base reference configuration and a delta configuration of the one of the LTM candidate cells, wherein the cell configurations needed to be used when sending an LTM handover preparation request to a target gNB-DU (i.e., a target gNB-DU), is dynamically managed by the gNB-CU thereby avoiding subsequent Long-Term Serving Cell Changes (LTM SCC) with additional RRC reconfigurations due to the UE's inability to prepare a full confirmation of the candidate cell.

FIG. 8 illustrates a flowchart of a method storing base reference configuration as a base reference configuration type to the plurality of base reference configuration types according to another embodiment. Referring to FIG. 8, in step 801, the gNB-CU determines associations between each base reference configuration and a type of corresponding target cell(s) and/or target gNB-DU(s).

In step 802, based on the associations, the gNB-CU determines an appropriate base reference configuration to send to a candidate/target gNB-DU according to a type and/or characteristics of the candidate/target gNB-DU, to prepare an inter gNB-DU LTM candidate cell hosted by the candidate/target gNB-DU.

The method according to FIG. 8 has the advantage that the gNB-CU determines associations between each base reference configuration and a type of corresponding target cell(s) and/or target gNB-DU(s). As result, the gNB-CU may easily determine which base reference configuration needs to be used when sending an LTM handover preparation request to a target gNB-DU (i.e., a target gNB-DU), thereby effectively avoiding subsequent Long-Term Serving Cell Changes (LTM SCC) with additional RRC reconfigurations due to the UE's inability to prepare a full cell configuration of the candidate cell.

Figure 9:
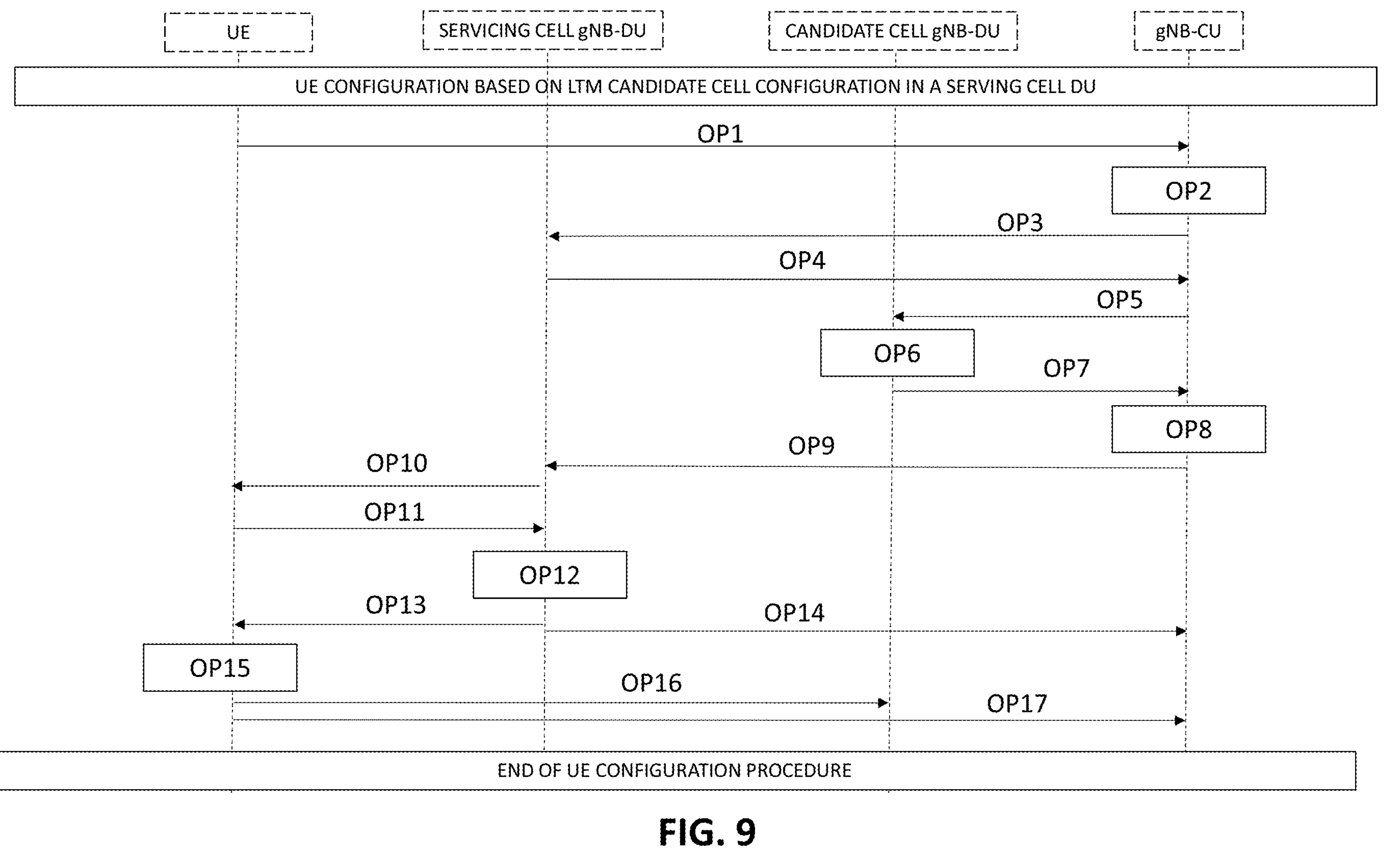
FIG. 9 illustrates a flowchart of a method for implementing multiple base reference configurations for layer 1/layer2 triggered mobility (LTM) according to another embodiment.

FIG. 9 illustrates an operation flowchart of a method for implementing multiple base reference configurations for layer 1/layer2 triggered mobility (LTM) according to an embodiment. Referring to FIG. 9, in operation 1, the UE sends a Layer 3 (L3) RRC Measurement Report message to a gNodeB (gNB).

In operation 2, based on the Layer 3 (L3) RRC Measurement Report message, the gNB-CU may determine to use LTM for the UE and initiates an inter-gNB-DU LTM candidate preparation (i.e., an inter-gNB-DU LTM candidate cell preparation).

In operation 3, the gNB-CU sends a user entity (UE) context modification request to the serving gNB-DU via an F1 interface.

In operation 4, based on the request, the gNB-CU receives a UE context modification response from the serving gNB-DU via the F1 interface, wherein the UE context modification response comprises the first base reference configuration.

In operation 5, based on the UE context modification response, the gNB-CU sends a UE context setup request, to the candidate gNB-DU via the F1 interface, wherein the UE context setup request comprises the first base reference configuration and/or an indication to prepare a new second reference configuration. For example, the gNB-CU sends the first base reference configuration to a candidate gNB-DU, wherein the candidate gNB-DU may host at least one candidate cell having a second base reference configuration.

In operation 6, the candidate gNB-DU compares the second base reference configuration with the first base reference configuration. Moreover, the candidate gNB-DU determines that the first base reference configuration data and the second base reference configuration data are different and based on the determination, the candidate gNB-DU prepares a candidate cell configuration comprising the second base reference configuration data and delta configuration data.

In operation 7, the candidate gNB-DU sends a UE context setup response to the gNB-CU via the F1 interface, wherein the UE context setup response comprises the candidate cell configuration (i.e., the candidate cell configuration comprising the second base reference configuration data and delta configuration data).

In operation 8, based on the candidate cell configuration, for each cell candidate having a second base reference configuration different from a first base reference configuration, the gNB-CU maps the second base reference configuration to a base reference configuration type from a plurality of base reference configuration types. Moreover, based on the mapping to the base reference configuration type maintained in the gNB-CU, the gNB-CU assigns a base reference configuration index to a base reference configuration type that is equal to the second base reference configuration. According to an embodiment, in operation 8, based on the candidate cell configuration, for each cell candidate having a second base reference configuration different from a first base reference configuration, the gNB-CU may determine that the second base reference configuration does not match any base reference configuration type from a plurality of base reference configuration types. In this case, the gNB-CU stores the second base reference configuration as a base reference configuration type to the plurality of base reference configuration types in order to maintain it in the gNB-CU.

In operation 9, the gNB-CU sends a radio resource control (RRC) reconfiguration message to the serving gNB-DU via the F1 interface, wherein the RRC reconfiguration message comprises the base reference configuration index and the delta configuration data of the candidate cell.

In operation 10, upon receipt of the RRC reconfiguration message, the serving gNB-DU sends an RRC reconfiguration message that comprises the base reference configuration index and the delta configuration data of the selected candidate cell to the UE.

In operation 11, the serving gNB-DU receives an inter-frequency Layer 1 (L1) measurement report from the UE.

In operation 12, based on the inter-frequency Layer 1 (L1) measurement report, the serving gNB-DU determines, that radio conditions of the candidate cell fulfill the conditions for a change of the service cell to the candidate cell.

In operation 13, the serving gNB-DU sends a Medium Access Control (MAC) Control Element (CE) comprising a serving cell change command to the UE.

In operation 14, the serving gNB-DU sends an LTM Serving Cell Change (SCC) notification via the F1 interface.

In operation 15, the UE prepares a candidate cell configuration based on the base reference configuration index and the delta configuration data of the selected candidate cell.

According to the embodiment, upon receipt of the RRC reconfiguration message, the UE may determine that the base reference configuration index does not match any base reference configuration index from a plurality of base reference configuration indices. In this case, the UE stores the base reference configuration index as referring to a second base reference configuration type.

In operation 16, after switching to the configuration of the candidate cell (i.e., target cell), the UE may perform a random access procedure toward the target cell hosted by the candidate gNB-DU.

In operation 17, the UE indicates successful completion of the LTM cell switch towards the target cell, for example, by sending an RRC Reconfiguration Acknowledgement message to the gNB.

Referring to FIG. 9, the layer 1 (L1)/layer 2 (L2) based mobility (i.e., lower layer triggered mobility (LTM)) enables a serving cell change via L1/L2 signaling while keeping configuration of the upper layers and/or minimizing changes of configuration of the lower layers. This helps to reduce the latency, overhead and interruption time during handover. The LTM supports both intra-distributed unit (DU) and intra-central unit (CU)-inter-DU mobility. During the LTM, the user plane is continued without a reset whenever possible (e.g., intra-DU), with the target cell to avoid data loss and the additional delay of data recovery.

Moreover, according to the method in FIG. 9, the gNB-CU, for each cell candidate having a second base reference configuration different from a first base reference configuration, maps the second base reference configuration to a base reference configuration type from a plurality of base reference configuration types. Further, based on the mapping to the base reference configuration type maintained in the gNB-CU, the gNB-CU assigns a base reference configuration index to the second base reference configuration (or the base reference configuration type corresponding to the second base reference configuration).

As a result, based on the multiple base reference configurations, the gNB-CU is aware of the kind of cells served by a gNB-DU and the gNB-CU may easily determine which base reference configuration needs to be used when sending an LTM handover preparation request to a target gNB-DU (i.e., a target gNB-DU), thereby effectively avoiding subsequent Long-Term Serving Cell Changes (LTM SCC) with additional RRC reconfigurations due to the UE's inability to prepare a full confirmation of the candidate cell.

Thus, unlike the related art, the method in FIG. 9 enables the use of multiple base reference configurations for different LTM candidate cells that allows to resolve the dilemma as set forth above and enhance new radio (NR) mobility by optimizing the LTM cell switching according to the state of the art illustrated in FIG. 2, FIG. 3A and FIG. 3B.

According to embodiments of FIGS. 4 to 9, the type and/or characteristics of a LTM candidate cell may comprise at least one of a cell frequency, a gNB-DU capability, a supported feature set and a cell size.

Figure 10:
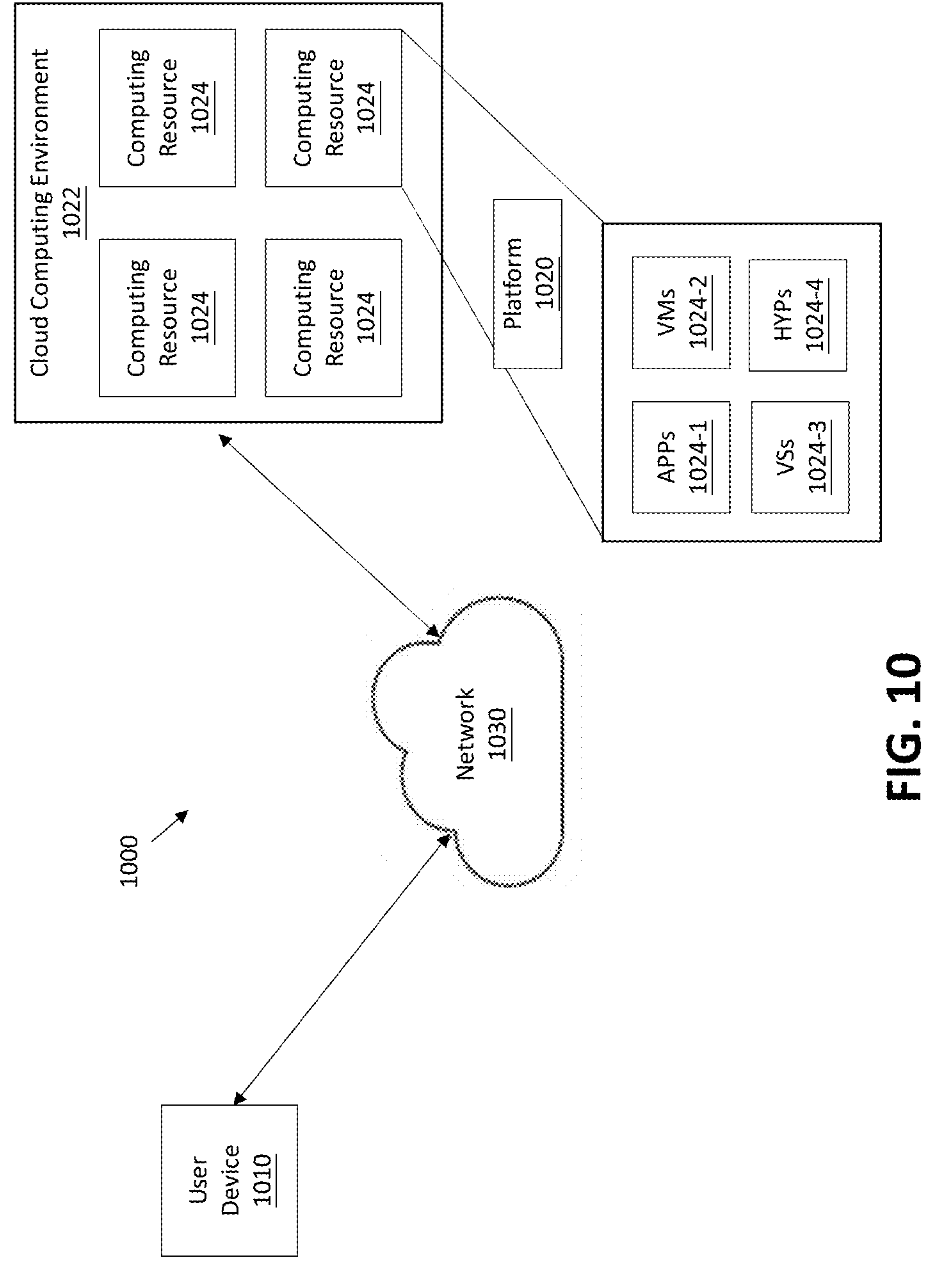
FIG. 10 is a diagram of an example environment in which systems and/or methods, described herein, may be implemented.

FIG. 10 is a diagram of an example environment 1000 in which systems and/or methods, described herein, may be implemented. As shown in FIG. 10, environment 1000 may include a user device 1010, a platform 1020, and a network 1030. Devices of environment 1000 may interconnect via wired connections, wireless connections, or a combination of wired and wireless connections. In embodiments, any of the functions and operations described with reference to FIGS. 1A through 9 above may be performed by any combination of elements illustrated in FIG. 10.

User device 1010 includes one or more devices capable of receiving, generating, storing, processing, and/or providing information associated with platform 1020. For example, user device 1010 may include a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smart watch), or a similar device. In some implementations, user device 1010 may receive information from and/or transmit information to platform 1020.

Platform 1020 includes one or more devices capable of receiving, generating, storing, processing, and/or providing information. In some implementations, platform 1020 may include a cloud server or a group of cloud servers. In some implementations, platform 1020 may be designed to be modular such that certain software components may be swapped in or out depending on a particular need. As such, platform 1020 may be easily and/or quickly reconfigured for different uses.

In some implementations, as shown, platform 1020 may be hosted in cloud computing environment 1022. Notably, while implementations described herein describe platform 1020 as being hosted in cloud computing environment 1022, in some implementations, platform 1020 may not be cloud-based (i.e., may be implemented outside of a cloud computing environment) or may be partially cloud-based.

Cloud computing environment 1022 includes an environment that hosts platform 1020. Cloud computing environment 1022 may provide computation, software, data access, storage, etc., services that do not require end-user (e.g., user device 1010) knowledge of a physical location and configuration of system(s) and/or device(s) that hosts platform 1020. As shown, cloud computing environment 1022 may include a group of computing resources 1024 (referred to collectively as "computing resources 1024" and individually as "computing resource 1024").

Computing resource 1024 includes one or more personal computers, a cluster of computing devices, workstation computers, server devices, or other types of computation and/or communication devices. In some implementations, computing resource 1024 may host platform 1020. The cloud resources may include compute instances executing in computing resource 1024, storage devices provided in computing resource 1024, data transfer devices provided by computing resource 1024, etc. In some implementations, computing resource 1024 may communicate with other computing resources 1024 via wired connections, wireless connections, or a combination of wired and wireless connections.

As further shown in FIG. 10, computing resource 1024 includes a group of cloud resources, such as one or more applications ("APPs") 1024-1, one or more virtual machines ("VMs") 1024-2, virtualized storage ("VSs") 1024-3, one or more hypervisors ("HYPs") 1024-4, or the like.

Application 1024-1 includes one or more software applications that may be provided to or accessed by user device 1010. Application 1024-1 may eliminate a need to install and execute the software applications on user device 1010. For example, application 1024-1 may include software associated with platform 1020 and/or any other software capable of being provided via cloud computing environment 1022. In some implementations, one application 1024-1 may send/receive information to/from one or more other applications 1024-1, via virtual machine 1024-2.

Virtual machine 1024-2 includes a software implementation of a machine (e.g., a computer) that executes programs like a physical machine. Virtual machine 1024-2 may be either a system virtual machine or a process virtual machine, depending upon use and degree of correspondence to any real machine by virtual machine 1024-2. A system virtual machine may provide a complete system platform that supports execution of a complete operating system ("OS"). A process virtual machine may execute a single program, and may support a single process. In some implementations, virtual machine 1024-2 may execute on behalf of a user (e.g., user device 1010), and may manage infrastructure of cloud computing environment 1022, such as data management, synchronization, or long-duration data transfers.

Virtualized storage 1024-3 includes one or more storage systems and/or one or more devices that use virtualization techniques within the storage systems or devices of computing resource 1024. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1024-4 may provide hardware virtualization techniques that allow multiple operating systems (e.g., "guest operating systems") to execute concurrently on a host computer, such as computing resource 1024. Hypervisor 1024-4 may present a virtual operating platform to the guest operating systems, and may manage the execution of the guest operating systems. Multiple instances of a variety of operating systems may share virtualized hardware resources.

Network 1030 includes one or more wired and/or wireless networks. For example, network 1030 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 10 are provided as an example. In practice, there may be additional devices and/or networks, fewer devices and/or networks, different devices and/or networks, or differently arranged devices and/or networks than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) of environment 1000 may perform one or more functions described as being performed by another set of devices of environment 1000.

Figure 11:
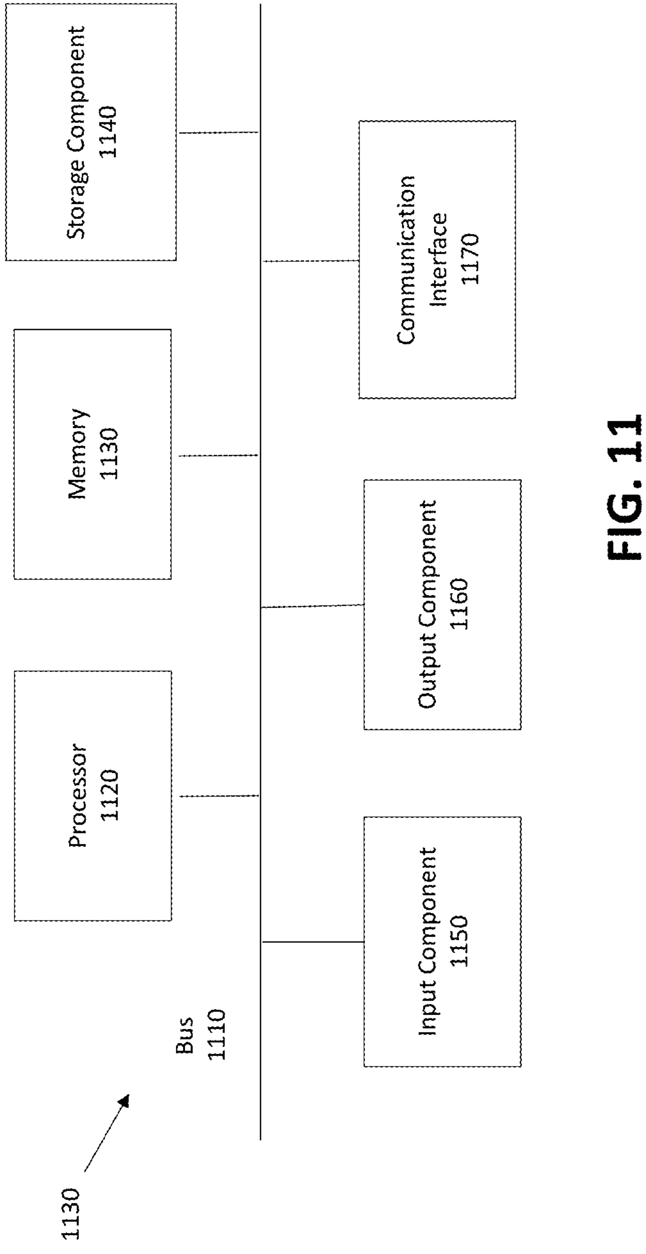
FIG. 11 is a diagram of example components of a device according to an embodiment.

FIG. 11 is a diagram of example components of a device 1100. Device 1100 may correspond to user device 1110 and/or platform 1120. As shown in FIG. 11, device 1100 may include a bus 1110, a processor 1120, a memory 1130, a storage component 1140, an input component 1150, an output component 1160, and a communication interface 1170.

Bus 1110 includes a component that permits communication among the components of device 1100. Processor 1120 may be implemented in hardware, firmware, or a combination of hardware and software. Processor 1120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1120 includes one or more processors capable of being programmed to perform a function. Memory 1130 includes a random-access memory (RAM), a read only memory (ROM), and/or another type of dynamic or static storage device (e.g., a flash memory, a magnetic memory, and/or an optical memory) that stores information and/or instructions for use by processor 1120.

Storage component 1140 stores information and/or software related to the operation and use of device 1100. For example, storage component 1140 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive. Input component 1150 includes a component that permits device 1100 to receive information, such as via user input (e.g., a touch screen display, a keyboard, a keypad, a mouse, a button, a switch, and/or a microphone). Additionally, or alternatively, input component 1150 may include a sensor for sensing information (e.g., a global positioning system (GPS) component, an accelerometer, a gyroscope, and/or an actuator). Output component 1160 includes a component that provides output information from device 1100 (e.g., a display, a speaker, and/or one or more light-emitting diodes (LEDs)).

Communication interface 1170 includes a transceiver-like component (e.g., a transceiver and/or a separate receiver and transmitter) that enables device 1100 to communicate with other devices, such as via a wired connection, a wireless connection, or a combination of wired and wireless connections. Communication interface 1170 may permit device 1100 to receive information from another device and/or provide information to another device. For example, communication interface 1170 may include an Ethernet interface, an optical interface, a coaxial interface, an infrared interface, a radio frequency (RF) interface, a universal serial bus (USB) interface, a Wi-Fi interface, a cellular network interface, or the like.

Device 1100 may perform one or more processes described herein. Device 1100 may perform these processes in response to processor 1120 executing software instructions stored by a non-transitory computer-readable medium, such as memory 1130 and/or storage component 1140. A computer-readable medium is defined herein as a non-transitory memory device. A memory device includes memory space within a single physical storage device or memory space spread across multiple physical storage devices.

Software instructions may be read into memory 1130 and/or storage component 1140 from another computer-readable medium or from another device via communication interface 1170. When executed, software instructions stored in memory 1130 and/or storage component 1140 may cause processor 1120 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 11 are provided as an example. In practice, device 1100 may include additional components, fewer components, different components, or differently arranged components than those shown in FIG. 11. Additionally, or alternatively, a set of components (e.g., one or more components) of device 1100 may perform one or more functions described as being performed by another set of components of device 1100.

In embodiments, any one of the operations or processes of FIGS. 1*a* to 9 may be implemented by or using any one of the elements illustrated in FIGS. 10 and 11.

It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various further respective aspects and features of embodiments of the present disclosure may be defined by the following items:

Item [1] A system for implementing multiple base reference configurations for layer1/layer2 triggered mobility (LTM) in a telecommunications network, the system includes: at least one memory storing instructions; and at least one processor configured to execute the instructions to: receive, by a Central Unit (gNB-CU) from a serving Distributed Unit (serving gNB-DU), a first base reference configuration and an indicator indicating an association between a type and/or characteristics of a first cell and the first base reference, wherein the serving gNB-DU supports the first cell having a first LTM cell configuration corresponding to the first base reference configuration, the first cell being a serving cell for a user equipment (UE); send, by the gNB-CU during candidate cell configuration preparation, the first base reference configuration or an indication to provide a new reference configuration to a target Distributed Unit (target gNB-DU), wherein the target gNB-DU supports a second cell to be prepared as a LTM candidate cell for an LTM handover; determine, by the target gNB-DU, whether the first base reference configuration is usable with a delta configuration to obtain a full second cell configuration for the second cell; and based on determining that the first base reference configuration is not usable to obtain the second cell configuration, send, by the target gNB-DU to the gNB-CU, a second base reference configuration corresponding to the second cell configuration.

Item [2] The system according to Item [1], wherein the least one processor may be further configured to execute the instructions to: based on determining that the first base reference configuration is not usable to obtain the second cell configuration, send, by the target gNB-DU to the gNB-CU, an indicator indicating an association between a type and/or characteristics of LTM candidate cells of the target gNB-DU and the second base reference configuration.

Item [3] The system according to any one of Items [1 to 2], wherein the least one processor may be further configured to execute the instructions to: based on a decision to prepare an inter gNB-DU LTM candidate cell, send, by the gNB-CU, a user equipment (UE) context setup or modification request to the serving gNB-DU via an F1 interface; based on the request, receive, by the gNB-CU, a UE context modification response from the serving gNB-DU via the F1 interface, wherein the UE context modification response may include the first base reference configuration; and based on the UE context setup or modification response, send, by the gNB-CU, a UE context setup request to the target gNB-DU via the F1 interface, wherein the UE context setup request may include the first base reference configuration.

Item [4] The system according to any one of Items [1 to 3], wherein the at least one processor may be further configured to execute the instructions to: send, by the target gNB-DU, a UE context setup response to the gNB-CU via the F1 interface, wherein the UE context setup response may include the second base reference configuration; assign, by the gNB-CU, mappings of base reference configurations and type and/or characteristics of LTM candidate cells, the mappings comprising a mapping between the first base reference configuration and the first cell and a mapping between the second base reference configuration and the second cell; and send, by the gNB-CU to the UE via the serving gNB-DU, a radio resource control (RRC) reconfiguration message, the RRC reconfiguration message indicating the mappings.

Item [5] The system according to any one of Items [1 to 4], wherein the at least one processor may be further configured to execute the instructions to: receive, by the serving gNB-DU, an Intra- or Inter-Frequency Layer 1 (L1) measurement report from the UE; based on the Intra- or Inter-Frequency L1 measurement report, determine, by the serving gNB-DU, to perform a serving cell change; and send, by the serving gNB-DU, a Medium Access Control (MAC) Control Element (CE) comprising a serving cell change command to the UE indicating a change to one of the LTM candidate cells, wherein a full LTM candidate cell configuration is obtained by the UE based on a base reference configuration and a delta configuration of the one of the LTM candidate cells, the base reference configuration being determined from the mappings included in the RRC Reconfiguration message.

Item [6] The system according to any one of any one of Items [1 to 5], wherein the at least one processor may be further configured to execute the instructions to: determine, by the gNB-CU, associations between each base reference configuration and a type of corresponding target cell(s) and/or target gNB-DU(s); and determine, by the gNB-CU and based on the associations, an appropriate base reference configuration to send to a candidate/target gNB-DU according to a type and/or characteristics of the candidate/target gNB-DU, to prepare an inter gNB-DU LTM candidate cell hosted by the candidate/target gNB-DU.

Item [7] The system according to any one of Items [1 to 6], wherein the type and/or characteristics of a LTM candidate cell may include at least one of a cell frequency, a gNB-DU capability, a supported feature set and a cell size.

Item [8] A method for implementing multiple base reference configurations for layer1/layer2 triggered mobility (LTM) in a telecommunications network, the method includes: receiving, by a Central Unit (gNB-CU) from a serving Distributed Unit (serving gNB-DU), a first base reference configuration and an indicator indicating an association between a type and/or characteristics of a first cell and the first base reference configuration, wherein the serving gNB-DU supports the first cell having a first LTM cell configuration corresponding to the first base reference configuration, the first cell being a serving cell for a user equipment (UE); sending, by the gNB-CU during candidate cell configuration preparation, the first base reference configuration or an indication to provide a new reference configuration to a target Distributed Unit (target gNB-DU), wherein the target gNB-DU supports a second cell to be prepared as a LTM candidate cell for an LTM handover; determining, by the target gNB-DU, whether the first base reference configuration is usable with a delta configuration to obtain a full second cell configuration for the second cell; and based on determining that the first base reference configuration is not usable to obtain the second cell configuration, sending, by the target gNB-DU to the gNB-CU, a second base reference configuration corresponding to the second cell configuration.

Item [9] The method according to Item [8], wherein the method may further include: based on determining that the first base reference configuration is not usable to obtain the second cell configuration, sending, by the target gNB-DU to the gNB-CU, an indicator indicating an association between a type and/or characteristics of LTM candidate cells of the target gNB-DU and the second base reference configuration.

Item [10] The method according to any one of Items [8 to 9], wherein the method may further include: based on a decision to prepare an inter gNB-DU LTM candidate cell, sending, by the gNB-CU, a user equipment (UE) context setup or modification request to the serving gNB-DU via an F1 interface; based on the request, receiving, by the gNB-CU, a UE context modification response from the serving gNB-DU via the F1 interface, wherein the UE context modification response may include the first base reference configuration; and based on the UE context setup or modification response, sending, by the gNB-CU, a UE context setup request to the target gNB-DU via the F1 interface, wherein the UE context setup request may include the first base reference configuration.

Item [11] The method according to any one of Items [8 to 10], wherein the method may further include: sending, by the target gNB-DU, a UE context setup response to the gNB-CU via the F1 interface, wherein the UE context setup response may include the second base reference configuration; assigning, by the gNB-CU, mappings of base reference configurations and type and/or characteristics of LTM candidate cells, the mappings comprising a mapping between the first base reference configuration and the first cell and a mapping between the second base reference configuration and the second cell; and sending, by the gNB-CU to the UE via the serving gNB-DU, a radio resource control (RRC) reconfiguration message, the RRC reconfiguration message indicating the mappings.

Item [12] The method according to any one of Items [8 to 11], wherein the method may further include: receiving, by the serving gNB-DU, an Intra- or Inter-Frequency Layer 1 (L1) measurement report from the UE; based on the Intra- or Inter-Frequency L1 measurement report, determining, by the serving gNB-DU, to perform a serving cell change; and sending, by the serving gNB-DU, a Medium Access Control (MAC) Control Element (CE) comprising a serving cell change command to the UE indicating a change to one of the LTM candidate cells, wherein a full LTM candidate cell configuration is obtained by the UE based on a base reference configuration and a delta configuration of the one of the LTM candidate cells, the base reference configuration being determined from the mappings included in the RRC Reconfiguration message.

Item [13] The method according to any one of Items [8 to 12], wherein the method may further include: determining, by the gNB-CU, associations between each base reference configuration and a type of corresponding target cell(s) and/or target gNB-DU(s); and determining, by the gNB-CU and based on the associations, an appropriate base reference configuration to send to a candidate/target gNB-DU according to a type and/or characteristics of the candidate/target gNB-DU, to prepare an inter gNB-DU LTM candidate cell hosted by the candidate/target gNB-DU.

Item [14] The method according to any one of Items [8 to 13], wherein the type and/or characteristics of a LTM candidate cell may include at least one of a cell frequency, a gNB-DU capability, a supported feature set and a cell size.

Item [15] A non-transitory computer-readable recording medium having recorded thereon instructions executable by at least one processor to cause the at least one processor to perform a method for implementing multiple base reference configurations for layer1/layer2 triggered mobility (LTM) in a telecommunications network, the method includes receiving, by a Central Unit (gNB-CU) from a serving Distributed Unit (serving gNB-DU), a first base reference configuration and an indicator indicating an association between a type and/or characteristics of a first cell and the first base reference configuration, wherein the serving gNB-DU supports the first cell having a first LTM cell configuration corresponding to the first base reference configuration, the first cell being a serving cell for a user equipment (UE); sending, by the gNB-CU during candidate cell configuration preparation, the first base reference configuration or an indication to provide a new reference configuration to a target Distributed Unit (target gNB-DU), wherein the target gNB-DU supports a second cell to be prepared as a LTM candidate cell for an LTM handover; determining, by the target gNB-DU, whether the first base reference configuration is usable with a delta configuration to obtain a full second cell configuration for the second cell; and based on determining that the first base reference configuration is not usable to obtain the second cell configuration, sending, by the target gNB-DU to the gNB-CU, a second base reference configuration corresponding to the second cell configuration.

Item [16] The non-transitory computer-readable recording medium according to Item [15], wherein the method may further include: based on determining that the first base reference configuration is not usable to obtain the second cell configuration, sending, by the target gNB-DU to the gNB-CU, an indicator indicating an association between a type and/or characteristics of LTM candidate cells of the target gNB-DU and the second base reference configuration.

Item [17] The non-transitory computer-readable recording medium according to any one of Items [15 to 16], wherein the method may further include: based on a decision to prepare an inter gNB-DU LTM candidate cell, sending, by the gNB-CU, a user equipment (UE) context setup or modification request to the serving gNB-DU via an F1 interface; based on the request, receiving, by the gNB-CU, a UE context modification response from the serving gNB-DU via the F1 interface, wherein the UE context modification response may include the first base reference configuration; and based on the UE context setup or modification response, sending, by the gNB-CU, a UE context setup request to the target gNB-DU via the F1 interface, wherein the UE context setup request may include the first base reference configuration.

Item [18] The non-transitory computer-readable recording medium according to any one of Items [15 to 17], wherein the method may further include: sending, by the target gNB-DU, a UE context setup response to the gNB-CU via the F1 interface, wherein the UE context setup response may include the second base reference configuration; assigning, by the gNB-CU, mappings of base reference configurations and type and/or characteristics of LTM candidate cells, the mappings comprising a mapping between the first base reference configuration and the first cell and a mapping between the second base reference configuration and the second cell; and sending, by the gNB-CU to the UE via the serving gNB-DU, a radio resource control (RRC) reconfiguration message, the RRC reconfiguration message indicating the mappings.

Item [19] The non-transitory computer-readable recording medium according to any one of Items [15 to 18], wherein the method may further include: receiving, by the serving gNB-DU, an Intra- or Inter-Frequency Layer 1 (L1) measurement report from the UE; based on the Intra- or Inter-Frequency L1 measurement report, determining, by the serving gNB-DU, to perform a serving cell change; and sending, by the serving gNB-DU, a Medium Access Control (MAC) Control Element (CE) comprising a serving cell change command to the UE indicating a change to one of the LTM candidate cells, wherein a full LTM candidate cell configuration is obtained by the UE based on a base reference configuration and a delta configuration of the one of the LTM candidate cells, the base reference configuration being determined from the mappings included in the RRC Reconfiguration message.

Item [20] The non-transitory computer-readable recording medium according to any one of Items [15 to 19], wherein the method may further include: determining, by the gNB-CU, associations between each base reference configuration and a type of corresponding target cell(s) and/or target gNB-DU(s); and determining, by the gNB-CU and based on the associations, an appropriate base reference configuration to send to a candidate/target gNB-DU according to a type and/or characteristics of the candidate/target gNB-DU, to prepare an inter gNB-DU LTM candidate cell hosted by the candidate/target gNB-DU.

What is claimed is:

1. A system comprising:

at least one memory storing instructions; and at least one processor configured to execute the instructions to:

receive, by a Central Unit (gNB-CU) from a serving Distributed Unit (serving gNB-DU), a first base reference configuration and an indicator indicating an association between a type and/or characteristics of a first cell and the first base reference configuration, wherein the serving gNB-DU supports the first cell having a first layer1/layer2 triggered mobility (LTM) cell configuration corresponding to the first base reference configuration, the first cell being a serving cell for a user equipment (UE), and wherein the gNB-CU maintains multiple base reference configurations associated with types and characteristics of a plurality of candidate cells;

send, by the gNB-CU during candidate cell configuration preparation, the first base reference configuration or an indication to provide a new reference configuration to a target Distributed Unit (target gNB-DU), wherein the target gNB-DU supports a second cell to be prepared as a LTM candidate cell for an LTM handover;

determine, by the target gNB-DU, whether the first base reference configuration is usable with a delta configuration to obtain a full second cell configuration for the second cell; and based on determining that the first base reference configuration is not usable to obtain the second cell configuration, send, by the target gNB-DU to the gNB-CU, a second base reference configuration corresponding to the second cell configuration.

2. The system as claimed in claim 1, wherein the least one processor is further configured to execute the instructions to:

based on determining that the first base reference configuration is not usable to obtain the second cell configuration, send, by the target gNB-DU to the gNB-CU, an indicator indicating an association between a type and/or characteristics of LTM candidate cells of the target gNB-DU and the second base reference configuration, wherein a first full cell configuration for the first cell corresponds to an association of the first base reference configuration and a first delta, and a second full cell configuration for the second cell corresponds to an association of the second base reference configuration and a second delta.

3. The system as claimed in claim 1, wherein the least one processor is further configured to execute the instructions to:

based on a decision to prepare an inter gNB-DU LTM candidate cell, send, by the gNB-CU, a user equipment (UE) context setup or modification request to the serving gNB-DU via an F1 interface;

based on the request, receive, by the gNB-CU, a UE context modification response from the serving gNB-DU via the F1 interface, wherein the UE context modification response comprises the first base reference configuration; and based on the UE context setup or modification response, send, by the gNB-CU, a UE context setup request to the target gNB-DU via the F1 interface, wherein the UE context setup request comprises the first base reference configuration, and wherein the target gNB-DU derives a second full cell configuration for the second cell using a second delta and one of the first base reference configuration or the second base reference configuration.

4. The system as claimed in claim 1, wherein the at least one processor is further configured to execute the instructions to:

send, by the target gNB-DU, a UE context setup response to the gNB-CU via the F1 interface, wherein the UE context setup response comprises the second base reference configuration;

assign, by the gNB-CU, mappings of base reference configurations and type and/or characteristics of LTM candidate cells, the mappings comprising a mapping between the first base reference configuration and the first cell and a mapping between the second base reference configuration and the second cell; and send, by the gNB-CU to the UE via the serving gNB-DU, a radio resource control (RRC) reconfiguration message, the RRC reconfiguration message indicating the mappings.

5. The system as claimed in claim 4, wherein the at least one processor is further configured to execute the instructions to:

receive, by the serving gNB-DU, an Intra-or Inter-Frequency Layer 1 (L1) measurement report from the UE;

based on the Intra-or Inter-Frequency L1 measurement report, determine, by the serving gNB-DU, to perform a serving cell change; and send, by the serving gNB-DU, a Medium Access Control (MAC) Control Element (CE) comprising a serving cell change command to the UE indicating a change to one of the LTM candidate cells, wherein a full LTM candidate cell configuration is obtained by the UE based on a base reference configuration and a delta configuration of the one of the LTM candidate cells, the base reference configuration being determined from the mappings included in the RRC Reconfiguration message.

6. The system as claimed in claim 5, wherein the at least one processor is further configured to execute the instructions to:

determine, by the gNB-CU, associations between each base reference configuration and a type of corresponding target cell(s) and/or target gNB-DU(s); and determine, by the gNB-CU and based on the associations, an appropriate base reference configuration to send to a candidate/target gNB-DU according to a type and/or characteristics of the candidate/target gNB-DU, to prepare an inter gNB-DU LTM candidate cell hosted by the candidate/target gNB-DU.

7. The system as claimed in claim 6, wherein the type and/or characteristics of a LTM candidate cell comprises at least one of a cell frequency, a gNB-DU capability, a supported feature set and a cell size.

8. A method comprising:

receiving, by a Central Unit (gNB-CU) from a serving Distributed Unit (serving gNB-DU), a first base reference configuration and an indicator indicating an association between a type and/or characteristics of a first cell and the first base reference configuration, wherein the serving gNB-DU supports the first cell having a first layer1/layer2 triggered mobility (LTM) cell configuration corresponding to the first base reference configuration, the first cell being a serving cell for a user equipment (UE), and wherein the gNB-CU maintains multiple base reference configurations associated with types and characteristics of a plurality of candidate cells;

sending, by the gNB-CU during candidate cell configuration preparation, the first base reference configuration or an indication to provide a new reference configuration to a target Distributed Unit (target gNB-DU), wherein the target gNB-DU supports a second cell to be prepared as a LTM candidate cell for an LTM handover;

determining, by the target gNB-DU, whether the first base reference configuration is usable with a delta configuration to obtain a full second cell configuration for the second cell; and based on determining that the first base reference configuration is not usable to obtain the second cell configuration, sending, by the target gNB-DU to the gNB-CU, a second base reference configuration corresponding to the second cell configuration.

9. The method as claimed in claim 8, wherein the method further comprises:

based on determining that the first base reference configuration is not usable to obtain the second cell configuration, sending, by the target gNB-DU to the gNB-CU, an indicator indicating an association between a type and/or characteristics of LTM candidate cells of the target gNB-DU and the second base reference configuration, wherein a first full cell configuration for the first cell corresponds to an association of the first base reference configuration and a first delta, and a second full cell configuration for the second cell corresponds to an association of the second base reference configuration and a second delta.

10. The method as claimed in claim 8, wherein the method further comprises:

based on a decision to prepare an inter gNB-DU LTM candidate cell, sending, by the gNB-CU, a user equipment (UE) context setup or modification request to the serving gNB-DU via an F1 interface;

based on the request, receiving, by the gNB-CU, a UE context modification response from the serving gNB-DU via the F1 interface, wherein the UE context modification response comprises the first base reference configuration; and based on the UE context setup or modification response, sending, by the gNB-CU, a UE context setup request to the target gNB-DU via the F1 interface, wherein the UE context setup request comprises the first base reference configuration, and wherein the target gNB-DU derives a second full cell configuration for the second cell using a second delta and one of the first base reference configuration or the second base reference configuration.

11. The method as claimed in claim 10, wherein the method further comprises:

sending, by the target gNB-DU, a UE context setup response to the gNB-CU via the F1 interface, wherein the UE context setup response comprises the second base reference configuration;

assigning, by the gNB-CU, mappings of base reference configurations and type and/or characteristics of LTM candidate cells, the mappings comprising a mapping between the first base reference configuration and the first cell and a mapping between the second base reference configuration and the second cell; and sending, by the gNB-CU to the UE via the serving gNB-DU, a radio resource control (RRC) reconfiguration message, the RRC reconfiguration message indicating the mappings.

12. The method as claimed in claim 11, wherein the method further comprises:

receiving, by the serving gNB-DU, an Intra-or Inter-Frequency Layer 1 (L1) measurement report from the UE;

based on the Intra-or Inter-Frequency L1 measurement report, determining, by the serving gNB-DU, to perform a serving cell change; and sending, by the serving gNB-DU, a Medium Access Control (MAC) Control Element (CE) comprising a serving cell change command to the UE indicating a change to one of the LTM candidate cells, wherein a full LTM candidate cell configuration is obtained by the UE based on a base reference configuration and a delta configuration of the one of the LTM candidate cells, the base reference configuration being determined from the mappings included in the RRC Reconfiguration message.

13. The method as claimed in claim 12, wherein the method further comprises:

determining, by the gNB-CU, associations between each base reference configuration and a type of corresponding target cell(s) and/or target gNB-DU(s); and determining, by the gNB-CU and based on the associations, an appropriate base reference configuration to send to a candidate/target gNB-DU according to a type and/or characteristics of the candidate/target gNB-DU, to prepare an inter gNB-DU LTM candidate cell hosted by the candidate/target gNB-DU.

14. The method as claimed in claim 13, wherein the type and/or characteristics of a LTM candidate cell comprises at least one of a cell frequency, a gNB-DU capability, a supported feature set and a cell size.

15. A non-transitory computer-readable recording medium having recorded thereon instructions executable by at least one processor to cause the at least one processor to perform a method comprising:

receiving, by a Central Unit (gNB-CU) from a serving Distributed Unit (serving gNB-DU), a first base reference configuration and an indicator indicating an association between a type and/or characteristics of a first cell and the first base reference configuration, wherein the serving gNB-DU supports the first cell having a first layer1/layer2 triggered mobility (LTM) cell configuration corresponding to the first base reference configuration, the first cell being a serving cell for a user equipment (UE), and wherein the gNB-CU maintains multiple base reference configurations associated with types and characteristics of a plurality of candidate cells;

sending, by the gNB-CU during candidate cell configuration preparation, the first base reference configuration or an indication to provide a new reference configuration to a target Distributed Unit (target gNB-DU), wherein the target gNB-DU supports a second cell to be prepared as a LTM candidate cell for an LTM handover;

determining, by the target gNB-DU, whether the first base reference configuration is usable with a delta configuration to obtain a full second cell configuration for the second cell; and based on determining that the first base reference configuration is not usable to obtain the second cell configuration, sending, by the target gNB-DU to the gNB-CU, a second base reference configuration corresponding to the second cell configuration.

16. The non-transitory computer-readable recording medium according to claim 15, wherein the method further comprises:

based on determining that the first base reference configuration is not usable to obtain the second cell configuration, sending, by the target gNB-DU to the gNB-CU, an indicator indicating an association between a type and/or characteristics of LTM candidate cells of the target gNB-DU and the second base reference configuration, wherein a first full cell configuration for the first cell corresponds to an association of the first base reference configuration and a first delta, and a second full cell configuration for the second cell corresponds to an association of the second base reference configuration and a second delta.

17. The non-transitory computer-readable recording medium according to claim 15, wherein the method further comprises:

based on a decision to prepare an inter gNB-DU LTM candidate cell, sending, by the gNB-CU, a user equipment (UE) context setup or modification request to the serving gNB-DU via an F1 interface;

based on the request, receiving, by the gNB-CU, a UE context modification response from the serving gNB-DU via the F1 interface, wherein the UE context modification response comprises the first base reference configuration; and based on the UE context setup or modification response, sending, by the gNB-CU, a UE context setup request to the target gNB-DU via the F1 interface, wherein the UE context setup request comprises the first base reference configuration, and wherein the target gNB-DU derives a second full cell configuration for the second cell using a second delta and one of the first base reference configuration or the second base reference configuration.

18. The non-transitory computer-readable recording medium according to claim 17, wherein the method further comprises:

sending, by the target gNB-DU, a UE context setup response to the gNB-CU via the F1 interface, wherein the UE context setup response comprises the second base reference configuration;

assigning, by the gNB-CU, mappings of base reference configurations and type and/or characteristics of LTM candidate cells, the mappings comprising a mapping between the first base reference configuration and the first cell and a mapping between the second base reference configuration and the second cell; and sending, by the gNB-CU to the UE via the serving gNB-DU, a radio resource control (RRC) reconfiguration message, the RRC reconfiguration message indicating the mappings.

19. The non-transitory computer-readable recording medium according to claim 18, wherein the method further comprises:

receiving, by the serving gNB-DU, an Intra-or Inter-Frequency Layer 1 (L1) measurement report from the UE;

based on the Intra-or Inter-Frequency L1 measurement report, determining, by the serving gNB-DU, to perform a serving cell change; and sending, by the serving gNB-DU, a Medium Access Control (MAC) Control Element (CE) comprising a serving cell change command to the UE indicating a change to one of the LTM candidate cells, wherein a full LTM candidate cell configuration is obtained by the UE based on a base reference configuration and a delta configuration of the one of the LTM candidate cells, the base reference configuration being determined from the mappings included in the RRC Reconfiguration message.

20. The non-transitory computer-readable recording medium according to claim 19, wherein the method further comprises:

determining, by the gNB-CU, associations between each base reference configuration and a type of corresponding target cell(s) and/or target gNB-DU(s); and determining, by the gNB-CU and based on the associations, an appropriate base reference configuration to send to a candidate/target gNB-DU according to a type and/or characteristics of the candidate/target gNB-DU, to prepare an inter gNB-DU LTM candidate cell hosted by the candidate/target gNB-DU.

* * * * *